US009892511B2

(12) United States Patent
Watanabe et al.

(10) Patent No.: US 9,892,511 B2
(45) Date of Patent: Feb. 13, 2018

(54) APPARATUS AND METHOD FOR VISUALIZATION OF MYOCARDIAL INFARCT AREAS AND ACCESSORY PATHWAYS

(71) Applicants: FUJITSU LIMITED, Kawasaki-shi, Kanagawa (JP); The University of Tokyo, Tokyo (JP)

(72) Inventors: Masahiro Watanabe, Kawasaki (JP); Satoshi Fuchikami, Fukuoka (JP); Yoshimasa Kadooka, Kawasaki (JP); Toshiaki Hisada, Tokyo (JP); Seiryo Sugiura, Tokyo (JP); Takumi Washio, Tokyo (JP); Jun-ichi Okada, Tokyo (JP)

(73) Assignees: FUJITSU LIMITED, Kawasaki (JP); THE UNIVERSITY OF TOKYO, Tokyo (JP)

( * ) Notice: Subject to any disclaimer, the term of this patent is extended or adjusted under 35 U.S.C. 154(b) by 212 days.

(21) Appl. No.: 14/715,972

(22) Filed: May 19, 2015

(65) Prior Publication Data
US 2015/0348310 A1      Dec. 3, 2015

(30) Foreign Application Priority Data
May 29, 2014   (JP) .................................. 2014-111540

(51) Int. Cl.
| G06T 15/08 | (2011.01) |
| G06T 7/00 | (2017.01) |
| G06T 19/00 | (2011.01) |

(52) U.S. Cl.
CPC ............ *G06T 7/0014* (2013.01); *G06T 19/00* (2013.01); *G06T 2210/41* (2013.01)

(58) Field of Classification Search
None
See application file for complete search history.

(56) References Cited

U.S. PATENT DOCUMENTS 5,687,737 A * 11/1997 Branham ............. A61B 5/0422
                                              600/509
6,187,032 B1    2/2001 Ohyu et al.
(Continued)

FOREIGN PATENT DOCUMENTS

| JP | 11-128191 | 5/1999 |
| JP | 2001-70269 | 3/2001 |
| JP | 2012-508079 | 4/2012 |

OTHER PUBLICATIONS

Patent Abstracts of Japan, Publication No. 11-128191, published May 18, 1999.
(Continued)

*Primary Examiner* — Ulka Chauhan
*Assistant Examiner* — Patrick F Valdez
(74) *Attorney, Agent, or Firm* — Staas & Halsey LLP

(57) ABSTRACT

A visualization apparatus includes a storage unit and a computation unit. The storage unit stores a three-dimensional model of a heart, excitation propagation data indicating temporal variations of electrical signal strength in myocardium during propagation of excitation in the heart, and infarct area data indicating locations of infarct areas in the heart. The computation unit places a measurement point on an accessory pathway between the infarct areas. Then based on the excitation propagation data, the computation unit determines a variation range of electrical signal strength as a range between its minimum and maximum values at the measurement point. The computation unit outputs a picture that visualizes propagation of cardiac excitation in the three-dimensional model, based on the excitation propaga-
(Continued)

tion data, by varying a visual property in the picture to represent variations of the electric signal strength within the determined variation range.

5 Claims, 19 Drawing Sheets

(56) References Cited

U.S. PATENT DOCUMENTS

| | | | | |
|---|---|---|---|---|
| 8,655,427 | B1* | 2/2014 | Greenspan | A61B 5/042 600/374 |
| 2003/0023130 | A1* | 1/2003 | Ciaccio | A61B 5/04011 600/12 |
| 2007/0053555 | A1* | 3/2007 | Ooi | A61B 6/461 382/128 |
| 2008/0082135 | A1* | 4/2008 | Arcot-Krishnamurthy | A61B 5/02028 607/9 |
| 2009/0099563 | A1* | 4/2009 | Ciaccio | A61B 5/1075 606/41 |
| 2009/0322323 | A1* | 12/2009 | Brazdeikis | A61B 5/05 324/244 |
| 2010/0317962 | A1* | 12/2010 | Jenkins | A61B 5/055 600/411 |
| 2012/0101398 | A1* | 4/2012 | Ramanathan | A61B 5/04012 600/523 |
| 2013/0006131 | A1* | 1/2013 | Narayan | A61B 5/042 600/508 |
| 2013/0253843 | A1* | 9/2013 | Dawson | A61B 5/04 702/19 |
| 2013/0274582 | A1* | 10/2013 | Afonso | A61B 5/0422 600/374 |
| 2014/0005563 | A1 | 1/2014 | Ramanathan et al. | |
| 2014/0088447 | A1* | 3/2014 | Massarwa | A61B 5/0044 600/508 |
| 2014/0303499 | A1* | 10/2014 | Toma | A61B 8/06 600/454 |
| 2014/0322688 | A1* | 10/2014 | Park | G09B 23/303 434/268 |

OTHER PUBLICATIONS

Espacenet Bibliographic data, Publication No. 2012-508079, published Apr. 5, 2012.
Patent Abstracts of Japan, Publication No. 2001-70269, published Mar. 21, 2001.

* cited by examiner

31 THREE-DIMENSIONAL MODEL

APPARATUS AND METHOD FOR VISUALIZATION OF MYOCARDIAL INFARCT AREAS AND ACCESSORY PATHWAYS

CROSS-REFERENCE TO RELATED APPLICATION

This application is based upon and claims the benefit of priority of the prior Japanese Patent Application No. 2014-111540, filed on May 29, 2014, the entire contents of which are incorporated herein by reference.

FIELD

The embodiments discussed herein relate to an apparatus and method for visualization.

BACKGROUND

The heart is a muscular organ that pumps blood out to the body. The heart of a normal person beats at regular time intervals, while that of a person manifesting symptoms of arrhythmia exhibits an excessively low heart rate or an excessively high heart rate even when no particular external causes are present. Arrhythmias with too slow heart beats (bradycardia) are called "bradyarrhythmias," and those with too rapid heart beats (tachycardia) are called "tachyarrhythmias."

Possible causes of arrhythmia include the presence of accessory pathways in the system of cardiac excitation propagation. Accessory pathway, also known as reentry, is an extra conduction path of electrical signals, running separately from a heart's own stimulus conduction system. The problem is that an accessory pathway could divert incoming electrical signals to a wrong direction. If the signal direction is reversed, it makes a local loop of stimulus propagation, which keeps the heart receiving frequent contraction signals and thus causes tachyarrhythmia.

As a medical treatment for arrhythmias resulting from an accessory pathway, catheter ablation is used to cauterize a spot of tissue having abnormal excitation that causes tachycardia. During a catheter ablation procedure, an electrode catheter is inserted into the heart, and a radio-frequency (RF) current is passed between the inserted electrode and a return electrode attached to the body surface to generate heat at the tachycardia-causing spot. The cauterization closes off the harmful accessory pathway, thereby reducing or eliminating occurrence of arrhythmia.

What is particularly important in catheter ablation is how to determine the exact location of an accessory pathway. One method for this is to use a computer to simulate propagation of cardiac excitation.

Simulation of cardiac excitation conduction is a kind of numerical analysis for computationally reproducing functions of a heart, which mimics electrical activities (propagation of excitation) in myocardium with progress of time. Specifically, a heart model of an arrhythmia patient is subjected to this simulation to analyze how the electrical stimulus signal travels in his or her heart's muscle when it is experiencing arrhythmia.

For example, one proposed medical instrument permits analysis of electrical activities in a heart, on the basis of measurement data obtained from a test subject (patient) as to the electrical potential or magnetic field or both. The outcome of this analysis is then visualized for effective use in a subsequent catheter ablation treatment for the patient's arrhythmia. Visualization of electrophysiological data may be achieved by using, for example, an existing technique that provides spatial representation of information on a graphic image of a predetermined surface area of an organ.

As another applicable tool, an electrophysiological mapping system may be used to determine the target location of an ablation surgery. This electrophysiological mapping system enables the user to understand spatial relationships between mapping data and anatomical features of a heart in preparation for catheter-based RF ablation. See, for example, the following documents:

Japanese Laid-open Patent Publication No. 11-128191
Japanese National Publication of International Patent Application No. 2012-508079
Japanese Laid-open Patent Publication No. 2001-070269

The above-noted conventional techniques and systems are, however, not helpful enough for medical practitioners to understand how the excitation signals propagate along an accessory pathway in a patient's heart. That is, it is hard to provide an easy-to-understand view of electrical signal waves that cause cardiac excitation because of their complicated moving directions in a heart under the condition of arrhythmia. While it is possible to generate a picture visualizing electrical activities in the entire heart, the viewer would still be unable to find out which part of the picture contains accessory pathways and is thus likely to overlook them.

SUMMARY

In one aspect of the embodiments discussed herein, there is provided a visualization apparatus including a memory and a processor. The memory is configured to store a three-dimensional model of a heart, excitation propagation data, and infarct area data, the excitation propagation data indicating temporal variations of electrical signal strength in myocardium during propagation of excitation in the heart, the infarct area data indicating locations of infarct areas in the heart. The processor is configured to perform a procedure including: placing a measurement point on an accessory pathway between the infarct areas that are recorded in the infarct area data; determining a variation range of electrical signal strength, based on the excitation propagation data, the variation range being a range between minimum and maximum values of electrical signal strength at the measurement point; and outputting a picture that visualizes propagation of cardiac excitation in the three-dimensional model, based on the excitation propagation data, by varying a visual property in the picture to represent variations of the electric signal strength in myocardium within the determined variation range.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Several embodiments will be described below with reference to the accompanying drawings. These embodiments may be combined in various ways, unless they have contradictory features.

(a) First Embodiment

The description begins with a first embodiment, which displays a three-dimensional cardiac model with an enhanced visibility of moving waves of cardiac excitation that propagates through an arrhythmia-causing accessory pathway.

Figure 1:
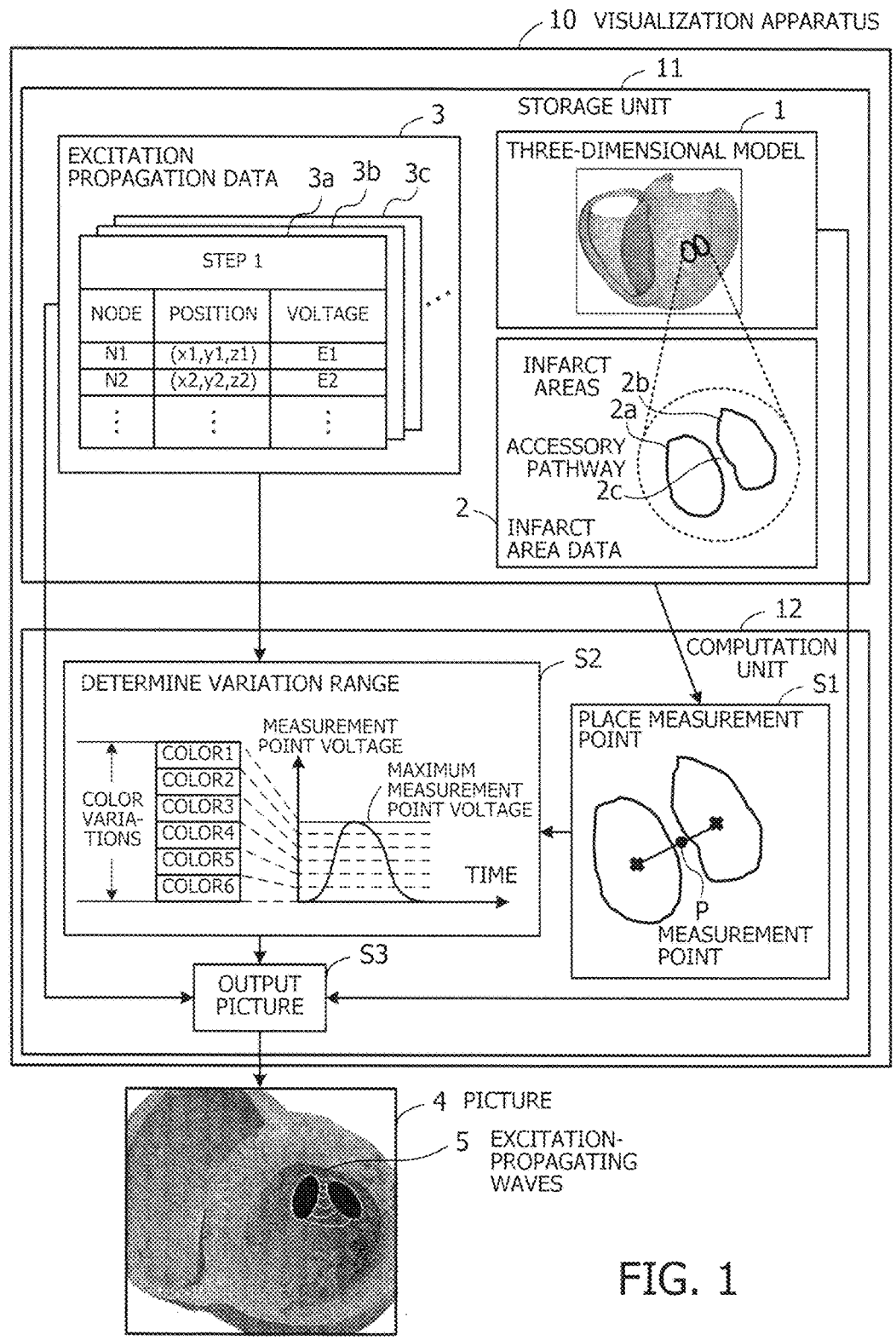
FIG. 1 illustrates an exemplary functional structure of a visualization apparatus according to a first embodiment.

FIG. 1 illustrates an exemplary functional structure of a visualization apparatus according to a first embodiment. The illustrated visualization device 10 includes a storage unit 11 and a computation unit 12. The storage unit 11 contains a three-dimensional cardiac model 1, infarct area data 2, and excitation propagation data 3. The three-dimensional cardiac model 1 is a structure model representing a heart structure in the form of a set of meshes or other elements. The infarct area data 2 describes infarct areas 2a and 2b in the heart. That is, the infarct area data 2 is a piece of data that indicates two or more areas whose myocardial cells are dead or dying due to infarction. The term "infarct area" refers to such an area of damaged cardiac muscle cells.

The excitation propagation data 3 indicates temporal variations of electrical signals that stimulate myocardium in the electrical conduction system of the heart. For example, the excitation propagation data 3 may be a collection of myocardial voltage values that have obtained through a simulation of cardiac excitation propagation. More specifically, the excitation propagation data 3 is formed from a plurality of voltage datasets 3a, 3b, 3c, . . . that include, for example, information about the locations of nodes constituting the three-dimensional cardiac model 1 and their respective node voltages at each different simulation time step.

The computation unit 12 visualizes myocardial electrical signals (e.g., voltages) that vary in the process of cardiac excitation propagation, on the basis of the above data stored in the storage unit 11. More specifically, variations of signal voltage are transformed into those of a specific visual property that is, for example, hue, saturation, value, or any combination of them. The details of this visualization processing will now be described below.

The computation unit 12 first places a measurement point P on an accessory pathway 2c running along a space between two infarct areas 2a and 2b in the three-dimensional cardiac model 1 (step S1). For example, the computation unit 12 obtains infarct areas 2a and 2b from the infarct area data 2 and detects an accessory pathway 2c between them. Then it seeks the narrowest part of the accessory pathway 2c and places a measurement point P at that part. For example, the computation unit 12 sets a plurality of control points in each of the two adjacent infarct areas 2a and 2b (referred to herein as the "first infarct area" and "second infarct area") and draws a plurality of line segments that connect the control points in the first infarct area 2a to those in the second infarct area 2b. The computation unit 12 determines which line segment is the shortest in length and selects a point that lies on the shortest line segment but does not belong to the first infarct area 2a or the second infarct area 2b. The selected point is then designated as a measurement point P.

The computation unit 12 now consults the excitation propagation data 3 to find the minimum and maximum values of electrical signal strength at the measurement point P and determines a minimum-to-maximum range (i.e., the range between the found minimum value and maximum value) as a variation range for visualization of electrical signal strength (step S2), so that the visual property is varied according to variations of electrical signal strength in that range. For example, the excitation propagation data 3 includes voltage values of each node at each time step, permitting the computation unit 12 to retrieve a time-series of voltage values at a node nearest to the measurement point P. The computation unit 12 then determines which of the obtained voltage values indicate the maximum and minimum.

During a simulation with the three-dimensional cardiac model 1, the computation unit 12 may reproduce actual beating motions of the heart in addition to the propagation of cardiac excitation, meaning that the measurement point P moves in accordance with the heart beat. That is, the heart simulation process reproduces heart beat motions in the form of deformation of the three-dimensional cardiac model 1. The computation unit 12 may thus be configured in this case to calculate a locus of measurement point P that moves as a result of such deformation seen in the simulation result and determine the minimum and maximum voltages on that locus. This feature enables the computation unit 12 to correctly determine the minimum and maximum voltage values, taking into account the simulated beating motion of the heart.

The computation unit 12 determines a variation range between the obtained maximum and minimum values electrical signals (e.g., voltages) at measurement point P, so that the visual property is varied according to the electrical signal values within that variation range. What is actually varied is luminance of color or chromatic tone. For example, the computation unit 12 may choose lightest and darkest colors to represent the maximum and minimum voltage values at measurement point P.

The three-dimensional cardiac model 1, when viewed as a whole, may have some myocardial nodes whose voltages exceed the maximum voltage at measurement point P. The computation unit 12 visualizes all these higher-voltage nodes by using, for example, the same value of visual property assigned to the maximum measurement point voltage. Some other nodes of the three-dimensional cardiac model 1 may have voltages lower than the minimum voltage at measurement point P. The computation unit 12 uses the same value of visual property assigned to the minimum voltage at measurement point P to visualize all those lower-voltage nodes. Alternatively, the computation unit may uniformly use predetermined values of visual property to represent voltages above the maximum voltage or below the minimum voltage of measurement point P.

Based on the excitation propagation data 3, the computation unit 12 outputs a picture 4 that visualizes propagation of cardiac excitation in the three-dimensional cardiac model 1 (step S3). In this step, variations of myocardial electric signal strength within the variation range are converted to variations of the visual property noted above. For example, the computation unit 12 produces a picture 4 of a sectional view of the three-dimensional cardiac model 1 with an appropriate cross-sectioning plane. In this course, the computation unit 12 applies a set of color values to the picture 4 according to the excitation propagation data 3, where the choice of color values depends on the voltage level in each painted portion of the model. The computation unit 12 produces such a picture 4 at each simulation time step and refreshes the display screen with the produced new picture 4 at fixed time intervals, thereby presenting the simulation result in an animated way.

In operation of the visualization device 10 described above, the computation unit 12 sets a measurement point P and determines the mapping of visual property against a variation range (i.e., minimum-to-maximum range) of voltage values at measurement point P. Referring to the example of FIG. 1, the variation range of voltage values is divided into six subranges, and different values of visual property are associated with different subranges. The computation unit 12 produces and refreshes a picture 4 that indicates how the excitation propagates in the heart.

The voltage at measurement point P on an accessory pathway 2c changes with time, and its maximum value is associated with a particular value of visual property that is suppose to indicate that value. Suppose, for example, that the maximum measurement point voltage is associated with the highest luminance. Then the user will be able to see the peak position of an excitation-propagating wave 5 as a conspicuous bright line in the resulting picture 4. The computation unit 12 outputs such a picture 4 at each simulation time step, thereby producing an animation that depicts how an excitation-propagating wave 5 moves along the accessory pathway 2c. These features of the computation unit 12 improve the visibility of excitation propagation in the accessory pathway 2c.

The above-described computation unit 12 may be implemented as, for example, functions performed by a processor in the visualization device 10. The storage unit 11 may be implemented as part of the data storage space of memory devices or the like in the visualization device 10. It is noted that the lines interconnecting the functional blocks in FIG. 1 represent some of their communication paths. The person skilled in the art would appreciate that there may be other communication paths in actual implementations.

(b) Second Embodiment

This section describes a second embodiment, which simulates propagation of cardiac excitation and the resulting heart beat motion of a patient of cardiac arrhythmia and depicts arrhythmia-causing accessory pathways (reentry) more conspicuously. The latter feature is achieved by mapping variations in myocardial voltage to those in color-making attributes, such as hue, saturation, or value, or any combination of them.

Figure 2:
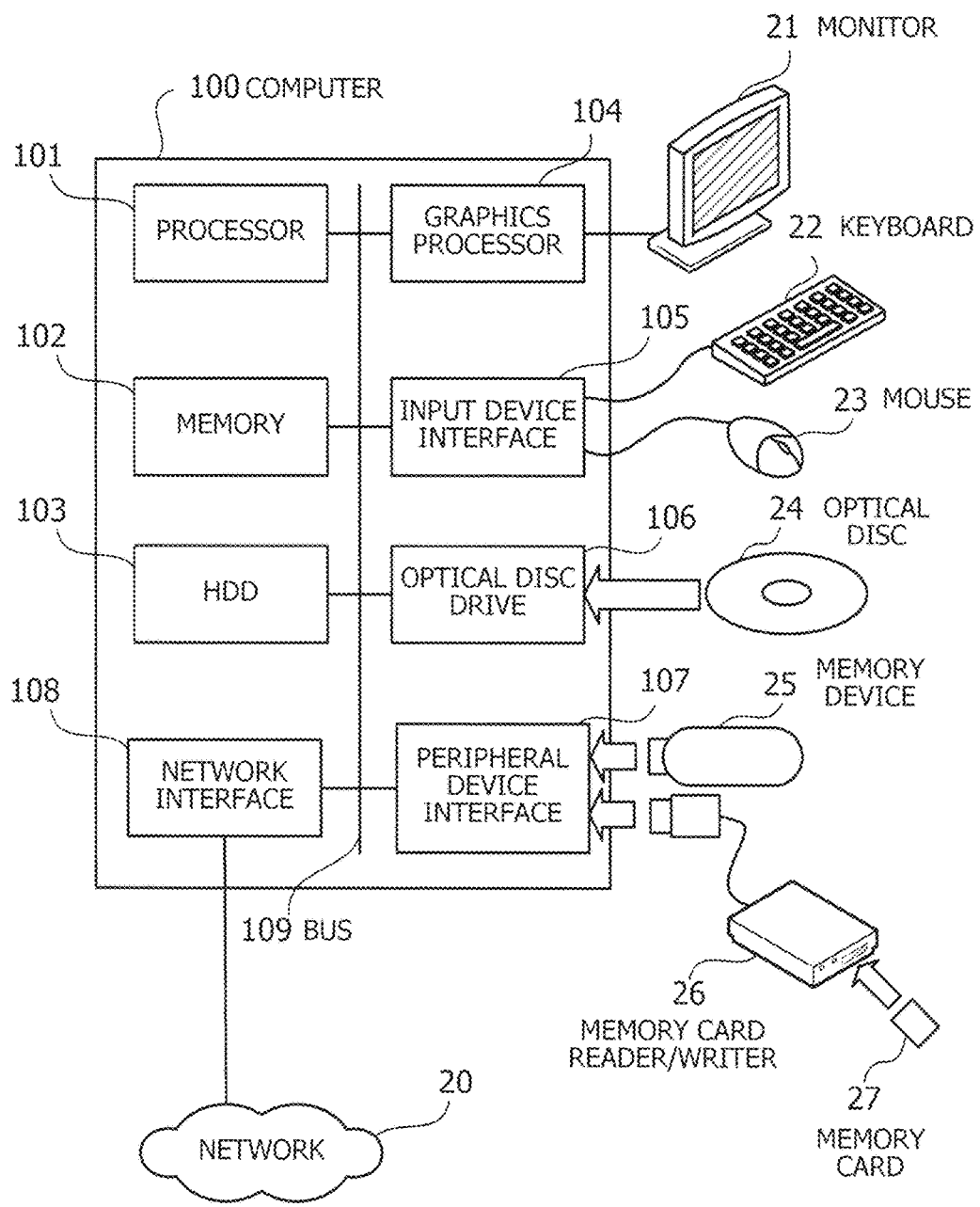
FIG. 2 illustrates an exemplary hardware configuration of a computer according to a second embodiment.

FIG. 2 illustrates an exemplary hardware configuration of a computer according to the second embodiment. The illustrated computer 100 includes a processor 101 to control its entire operation. The processor 101 is coupled to a memory 102 and other various devices and interfaces via a bus 109. The processor 101 may be a single processing device or a multiprocessor system including two or more processing devices, such as a central processing unit (CPU), micro processing unit (MPU), and digital signal processor (DSP). It is also possible to implement the processing functions of the processor 101 wholly or partly in an application-specific integrated circuit (ASIC), programmable logic device (PLD), or other electronic circuits, or their combinations.

The memory 102 serves as a primary storage device of the computer 100. Specifically, the memory 102 is used to temporarily store at least some of the operating system (OS) programs and application programs that the processor 101 executes, in addition to other various data objects that the processor 101 manipulates at runtime. The memory 102 may be, for example, a random access memory (RAM) or other volatile semiconductor memory devices.

Other devices on the bus 109 include a hard disk drive (HDD) 103, a graphics processor 104, an input device interface 105, an optical disc drive 106, a peripheral device interface 107, and a network interface 108. The HDD 103 writes and reads data magnetically on its internal platters. The HDD 103 serves as a secondary storage device in the management apparatus 100 to store program files and data files relating to the operating system and applications. Flash memory and other semiconductor memory devices may also be used as secondary storage devices, in place of or together with the HDD 103.

The graphics processor 104, coupled to a monitor 21, produces video images in accordance with drawing commands from the processor 101 and displays them on a screen of the monitor 21. The monitor 21 may be, for example, a cathode ray tube (CRT) display or a liquid crystal display.

The input device interface 105 is used to connect input devices such as a keyboard 22 and a mouse 23 and supply signals from these devices to the processor 101. The mouse 23 is a pointing device, which may be replaced with other kinds of pointing devices such as a touchscreen, tablet, touchpad, and trackball.

The optical disc drive 106 reads out data encoded on an optical disc 24, by using laser light or the like. The optical disc 24 is a portable data storage medium, the data recorded on which can be read as a reflection of light or the lack of the same. The optical disc 24 may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface for connecting some peripheral devices to the computer 100. For example, the peripheral device interface 107 may be used to connect a memory device 25 and a memory card reader/writer 26. The memory device 25 is a data storage medium with a capability of communicating with the peripheral device interface 107. The memory card reader/writer 26 is an adapter used to write data to or read data from a memory card 27, which is a data storage medium in the form of a small card.

The network interface 108 is connected to a network 20 to exchange data with other computers or network devices (not illustrated).

The above hardware configuration serves as a platform of processing functions to implement the second embodiment. It is noted that the foregoing visualization apparatus 10 of the first embodiment may also be implemented on the same hardware platform discussed in FIG. 2 for the computer 100 of the second embodiment.

The computer 100 provides various processing functions of the second embodiment by executing programs stored in a non-transitory computer-readable storage medium. These processing functions of the computer 100 are encoded in the form of computer programs, which may be stored in a variety of media. For example, the computer 100 may store program files in its own HDD 103. The processor 101 loads the memory 102 with at least part of these programs read out of the HDD 103 and executes them on the memory 102. It is also possible to store programs files in an optical disc 24, memory device 25, memory card 27, or the like. The programs stored in a portable storage medium are installed in the HDD 103 under the control of the processor 101, so that they are ready to execute upon request. It may also be possible for the processor 101 to execute program codes read out of a portable storage medium, without installing them in its local storage devices.

Figure 3:
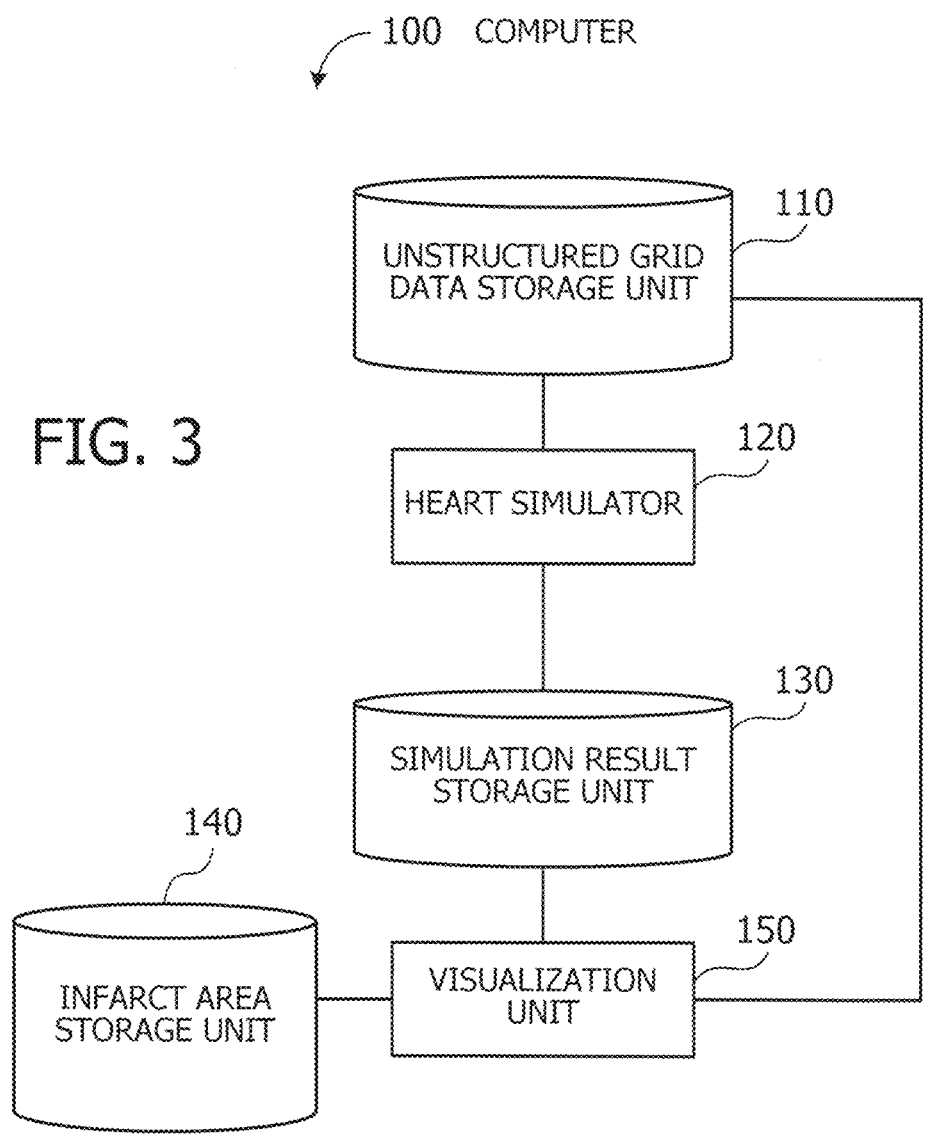
FIG. 3 is a functional block diagram of the computer of the second embodiment.

FIG. 3 is a functional block diagram of a computer of the second embodiment. The illustrated computer 100 includes an unstructured grid data storage unit 110, a heart simulator 120, a simulation result storage unit 130, an infarct area storage unit 140, and a visualization unit 150.

The unstructured grid data storage unit 110 stores unstructured grid data that describes the shape of a heart in three-dimensional form. For example, unstructured grid data expresses the geometry of a heart as a collection of tetrahedral elements with irregular shapes. More specifically, many nodes are placed in a heart simulation domain, and each four neighboring nodes define a tetrahedron. The heart is represented as a collection of many tetrahedrons each serving as an element that portrays myocardial cells. For example, the unstructured grid data storage unit 110 may be implemented as part of storage space of the memory 102 or HDD 103.

The heart simulator 120 mimics activities of a heart under test, including propagation of cardiac excitation and its resulting beating motion, on the basis of a given three-dimensional cardiac model. The heart simulator 120 outputs its simulation result to the simulation result storage unit 130. For example, the heart simulator 120 repetitively calculates new node positions of the three-dimensional model and some relating physical quantities (e.g., voltage) at each node or cardiac element, while advancing the simulation clock by a predetermined time step size. The node positions and their relating physical quantities at a specific time step are calculated on the basis of those obtained at one or more preceding time steps. The simulation result includes the calculated positions of nodes and new physical quantities at those nodes or elements at each predetermined point on the simulation time axis.

The simulation result storage unit 130 stores data of simulation results discussed above. For example, the simulation result storage unit 130 may be implemented as part of storage space of the memory 102 or HDD 103.

The infarct area storage unit 140 stores information indicating which part of the myocardium suffers from infarction. For example, the infarct area storage unit 140 may be implemented as part of storage space of the memory 102 or HDD 103.

The visualization unit 150 produces pictures on the monitor 21 to visualize the propagation of cardiac excitation with time in the form of voltage variations. Upon user request, the visualization unit 150 may further give a visual emphasis on the heart's reentry paths to conspicuously depict the propagation.

The visualization unit 150 is an exemplary implementation of the computation unit 12 discussed previously in FIG. 1 for the first embodiment. The unstructured grid data storage unit 110, simulation result storage unit 130, and infarct area storage unit 140 are collectively equivalent to the storage unit 11 discussed previously in FIG. 1 for the first embodiment. It is noted that the lines interconnecting the functional blocks in FIG. 2 represent some of their communication paths. The person skilled in the art would appreciate that there may be other communication paths in actual implementations. It is also noted that the functions of each element seen in FIG. 2 may be implemented as program modules executed by a computer.

Figure 4:
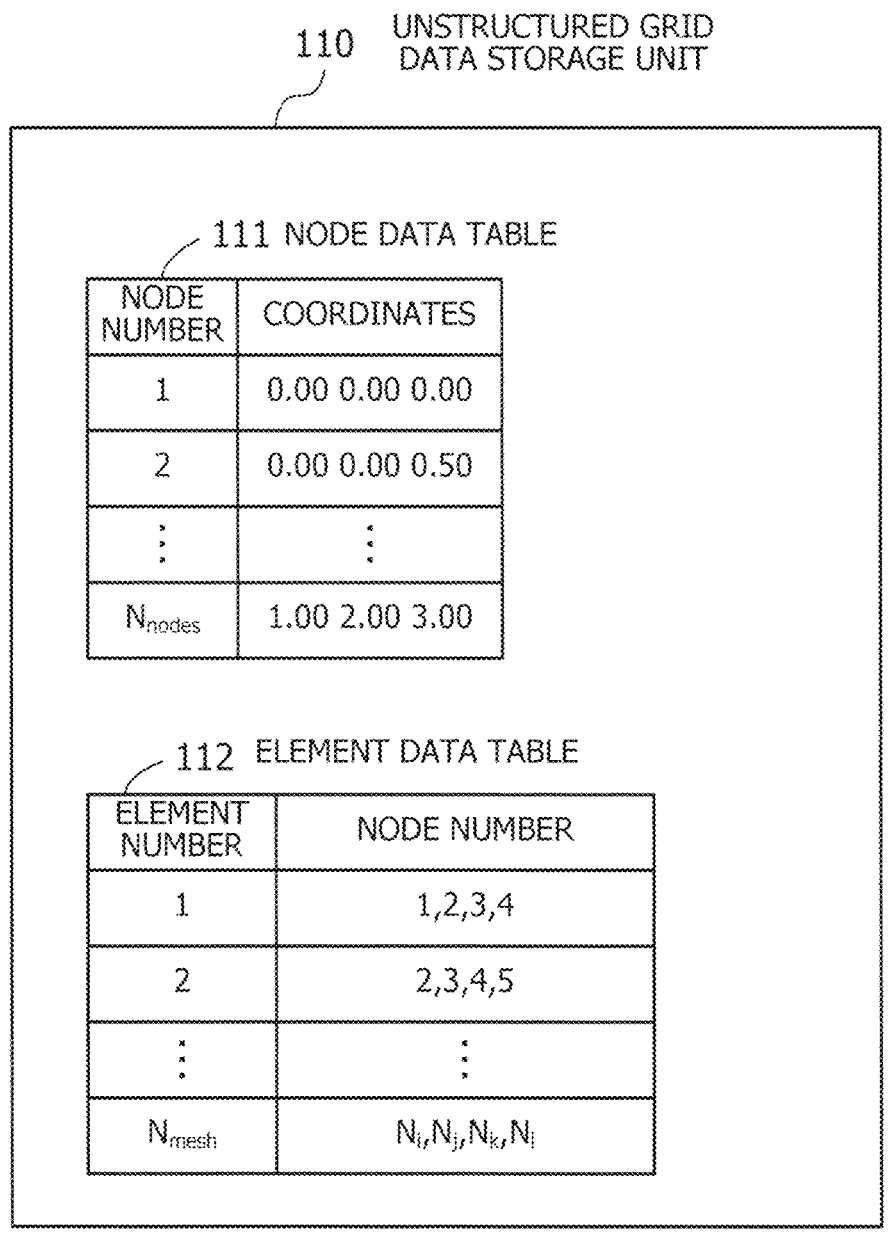
FIG. 4 illustrates an exemplary structure of data stored in an unstructured grid data storage unit.

Referring now to FIG. 4, an exemplary structure of data stored in the unstructured grid data storage unit 110 will be described below. The unstructured grid data storage unit 110 contains, for example, a node data table 111 and an element data table 112, which constitute unstructured grid data. Each entry of the node data table 111 defines a node as a combination of its node number and coordinate position. The node coordinates defined in this node data table 111 indicate the initial position of each node before a simulation is started, and they are changed with the progress of simulated heart beat motion. The element data table 112, on the other hand, describes tetrahedral elements of a cardiac model. Specifically, each tetrahedral element is distinguished by a specific element number, and its four corners are designated by their corresponding node numbers.

Figure 5:
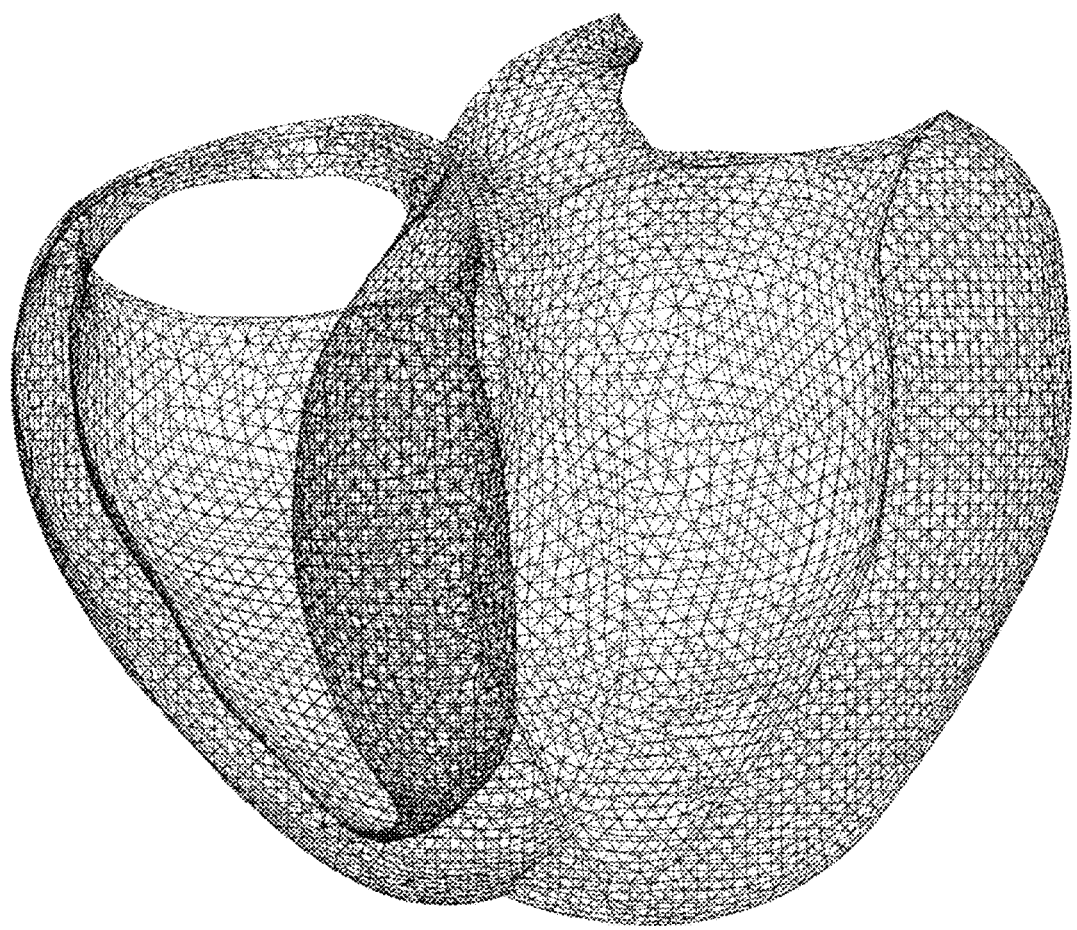
FIG. 5 illustrates an example of a three-dimensional cardiac model.

A three-dimensional cardiac model is produced from the above data stored in the unstructured grid data storage unit 110 of FIG. 4. FIG. 5 illustrates an example of such a three-dimensional cardiac model. The illustrated three-dimensional model 31 is formed from a large number of tetrahedral elements. With a given initial condition of electrical signals in this three-dimensional model 31, the heart simulator 120 computationally reproduces a process of electrical signal conduction in the heart muscle. The three-dimensional model 31 is also given some other conditions relating to the contraction and relaxation of myocardium, enabling the heart simulator 120 to mimic the heart's mechanical behavior (motion) as well. As the simulation progresses, its outcome is accumulated in the simulation result storage unit 130 as will be described below.

Figure 6:
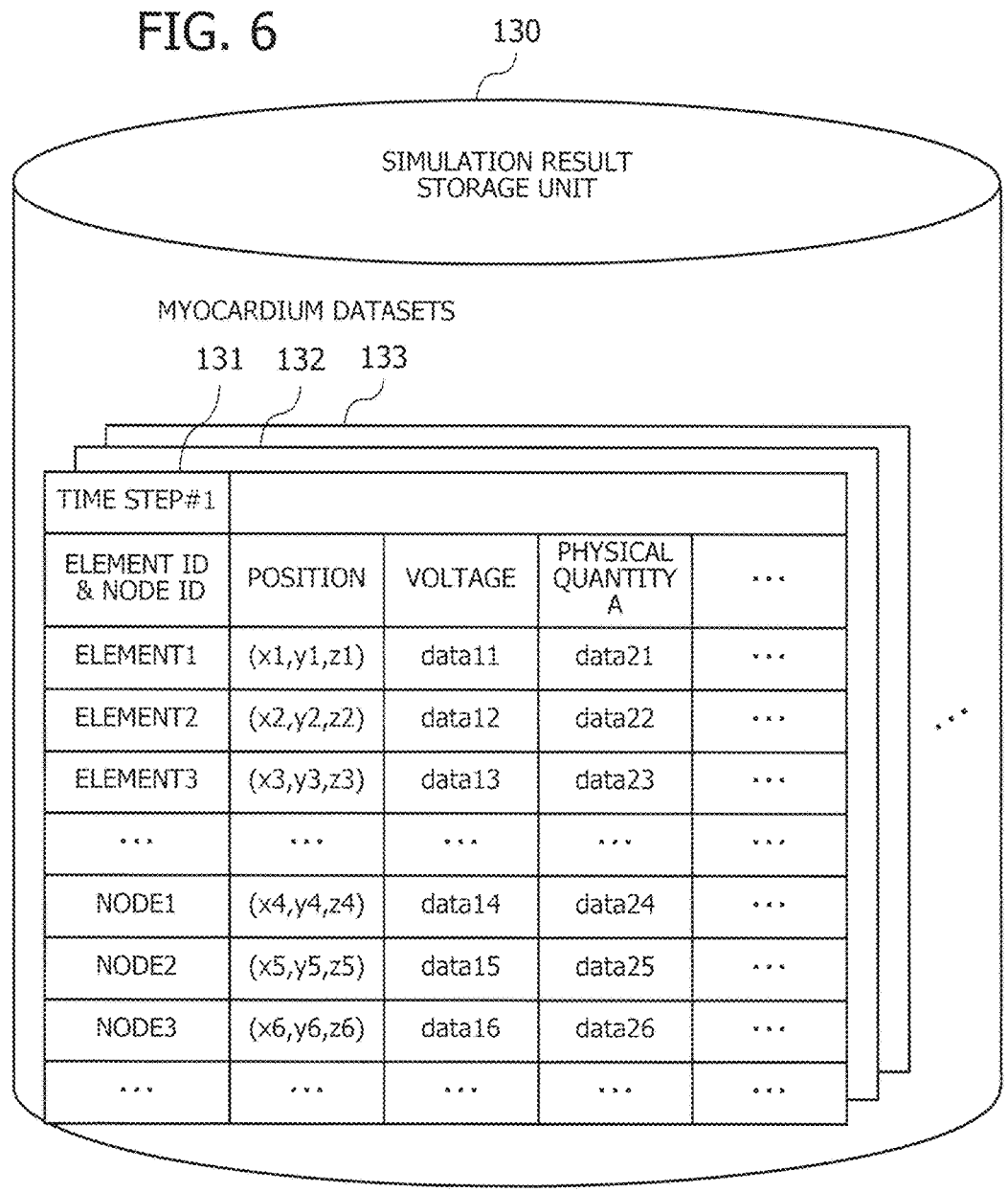
FIG. 6 illustrates an exemplary structure of data stored in a simulation result storage unit.

FIG. 6 illustrates an exemplary structure of data stored in a simulation result storage unit. Each single cycle of computation in the simulation process is referred to as a "simulation time step" or simply "time step." The simulation result storage unit 130 contains a plurality of myocardium datasets 131, 132, 133, . . . obtained at different time steps. These myocardium datasets 131, 132, 133, . . . thus represent the varying state of the heart over a series of time steps.

More specifically, each record in the myocardium datasets 131, 132, 133, . . . is associated with a particular element or node of the three-dimensional model and thus includes its element ID or node ID, coordinate position, and its physical quantities including voltage. The coordinate position of a tetrahedral element actually means its centroid, or the center of gravity. Each column of physical quantity is populated with data only in the element records, or only in the node records, or in the both.

Figure 7:
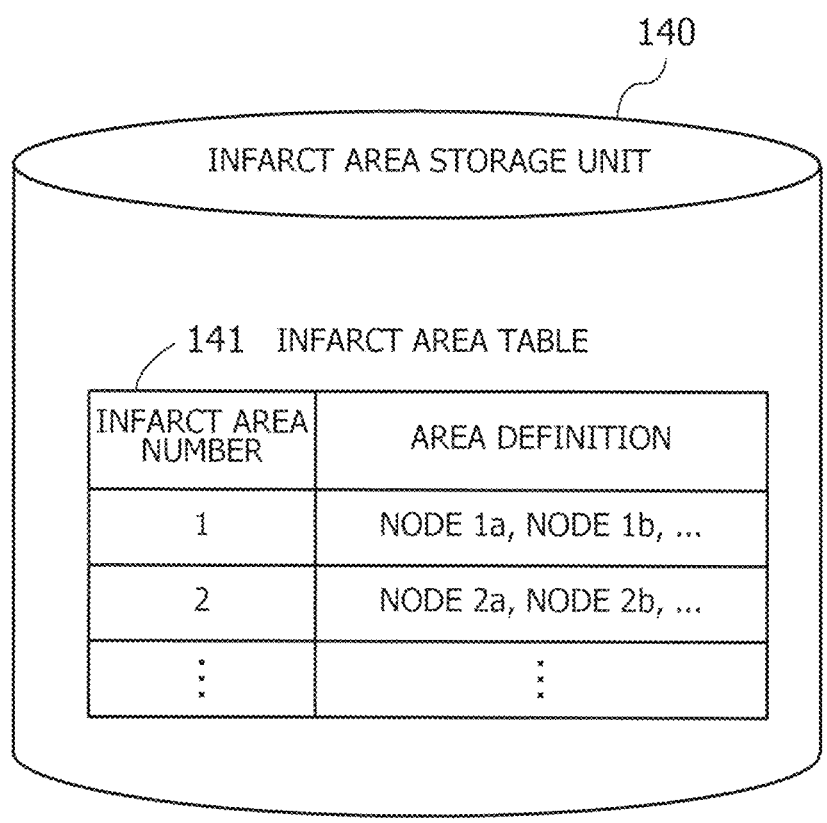
FIG. 7 illustrates an exemplary structure of data stored in an infarct area storage unit.

FIG. 7 illustrates an exemplary structure of data stored in an infarct area storage unit. The illustrated infarct area storage unit 140 contains an infarct area table 141. Each entry of this infarct area table 141 includes an infarct area number and its corresponding area definition. The infarct area number identifies a particular area experiencing infarction in the heart, and its corresponding area definition field contains a series of node numbers indicating the periphery of that infarct area. That is, the periphery of an infarct area is drawn by connecting the specified nodes in the order of node numbers seen in the infarct area table 141. While the example of FIG. 7 specifies an infarct area by enumerating such peripheral nodes, the second embodiment is not limited by this specific example. Alternatively, an infarct area may be specified as a set of elements contained therein.

Figure 8:
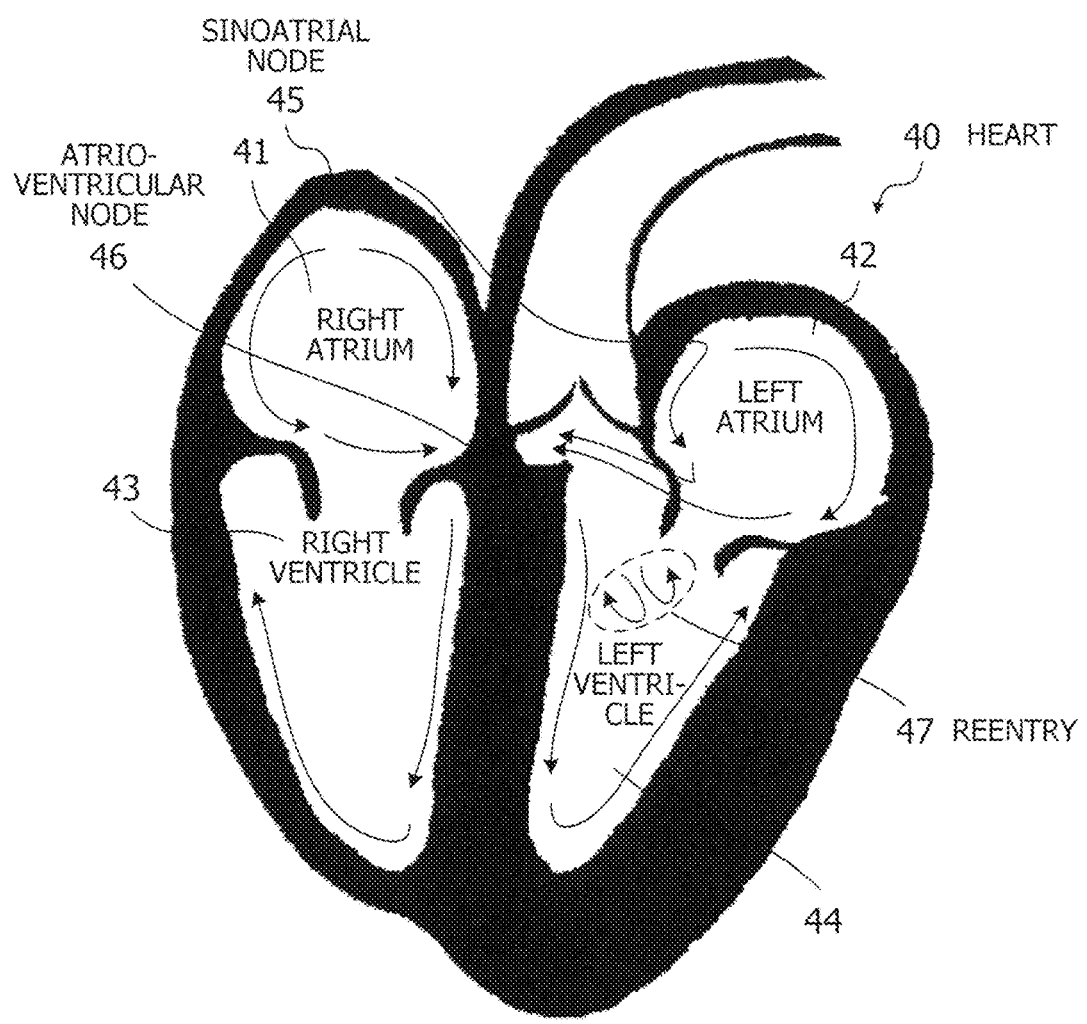
FIG. 8 illustrates a heart experiencing reentry.

Referring now to FIG. 8, the following description explains reentry in a heart by way of example. FIG. 8 illustrates a heart experiencing reentry. The illustrated heart 40 is formed from four chambers called right atrium 41, left atrium 42, right ventricle 43, and left ventricle 44. Each of these heart chambers contracts in accordance with an electrical signal that propagates excitation through a stimulus conduction system. Specifically, the stimulus conduction system is made up of a collection of muscle cells specialized for conducting electrical signals that stimulate muscle contraction.

The source of electrical signals in the stimulus conduction system sits in the right atrium 41 and called the "sinoatrial node" 45. The sinoatrial node 45 generates an electrical impulse signal at regular intervals without the need for external stimulation. The generated signal is sent first to the right atrium 41, and to the left atrium as well, and propagates through the atrial muscle before reaching the place called "atrioventricular node" 46. The muscle of the right atrium 41 and left atrium 42 contract in response to the electrical signals that they receive. Then with some delay time after that, the atrioventricular node 46 transfers the electrical signal to the ventricles. The electrical signal then bifurcates to the left and right bundle branches. These signals go down to the bottom of each ventricle and then propagate across the entire ventricular muscle.

What has been described above is a normal operation of the stimulus conduction system. Some people may, however, have another pathway in their heart 40 that conducts electrical signals in an abnormal way. FIG. 5 illustrates such an additional conduction pathway called "reentry" 47 (also called accessory pathway or bypass tract). The presence of this reentry 47 causes electrical signals to locally go back to upstream regions as opposed to their intended direction, thus making a loop of electrical conduction. This electrical conduction loop produces rapid contraction of muscle in the heart 40 and thus results in tachyarrhythmia. Tachyarrhythmias include those that cause ventricular fibrillation (i.e., quiver of the ventricles), making the heart 40 unable to pump blood out to the body.

The excitation-causing electrical signals are observed as the voltage potential of myocardium. Temporal variations of such myocardial voltage may be displayed in an animated way, allowing the viewer to visually understand the condition of the heart in terms of whether the excitation spreads properly. For example, those variations of cardiac voltage may be represented as a gradation of color.

Figure 9:
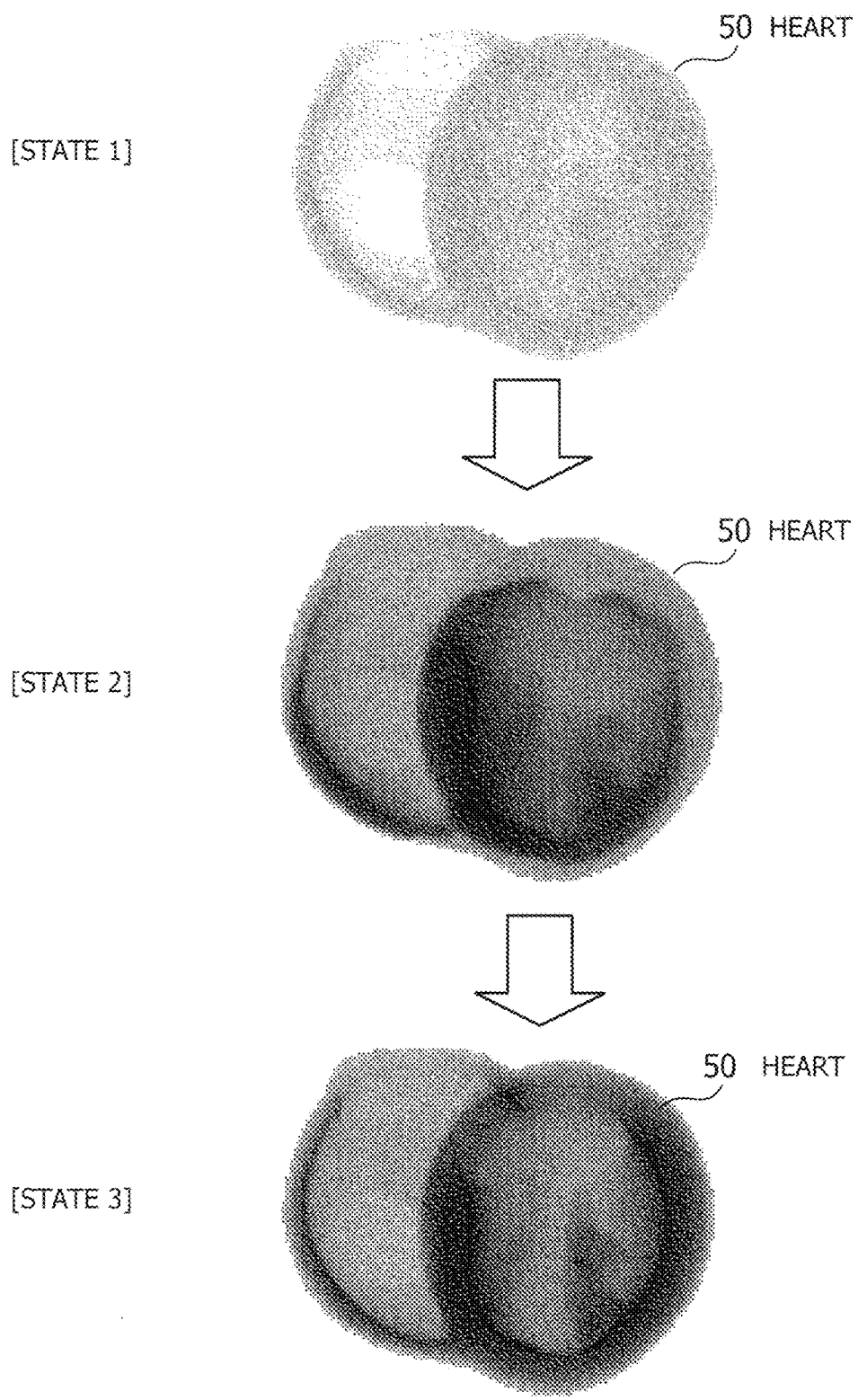
FIG. 9 is an example of screenshots depicting propagation of excitation in the heart of a normal person.

FIG. 9 is an example of screenshots depicting propagation of excitation in the heart of a normal person. The top image labeled [State 1] depicts a heart 50 immediately after it has started a beat cycle. The middle image labeled [State 2] depicts the same in the middle of the beat cycle. The bottom image labeled [State 3] depicts the same immediately before the beat cycle is finished. These normal images of FIG. 9 illustrate that electrical signals propagate along the stimulus conduction system in an orderly manner just like the wavefront of a traveling wave spreading over the medium.

Figure 10:
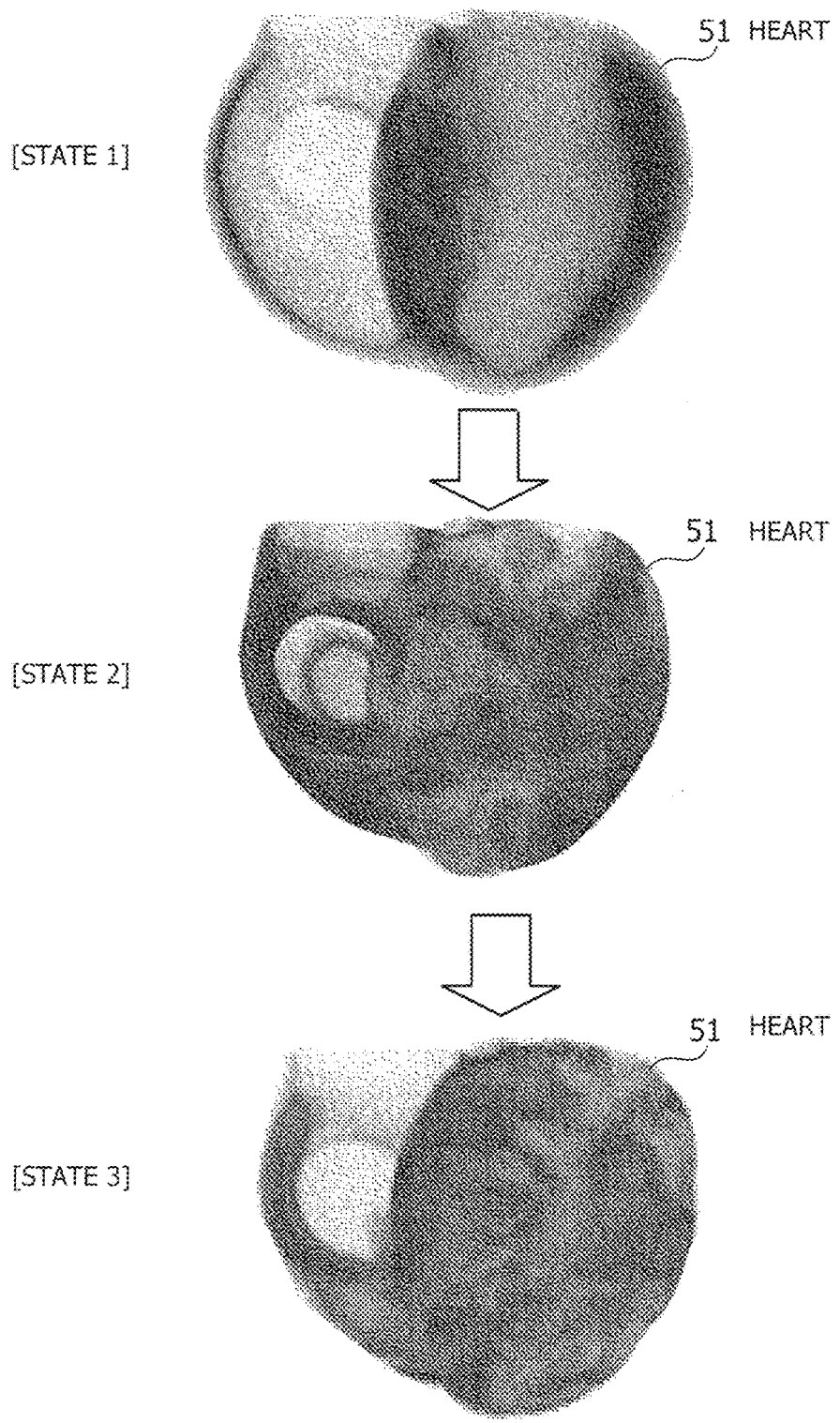
FIG. 10 is an exemplary of screenshots depicting propagation of excitation in the heart of a patient with ventricular fibrillation.

FIG. 10 is an exemplary of screenshots depicting propagation of excitation in the heart of a patient with ventricular fibrillation. The top image labeled [State 1] depicts a heart 51 immediately after it has started a beat cycle. The middle image labeled [State 2] depicts the same in the middle of the beat cycle. The bottom image labeled [State 3] depicts the same immediately before the beat cycle is finished. As can be seen from FIG. 10, the heart experiencing ventricular fibrillation propagates electrical signals indiscriminately, unlike the heart 50 of a normal person.

While the above example of FIG. 10 assumes the case of ventricular fibrillation, the second embodiment is not limited by this specific example. The person skilled in the art would appreciate that the embodiments may also be applicable to simulation of a heart with atrial fibrillation.

Figure 11:
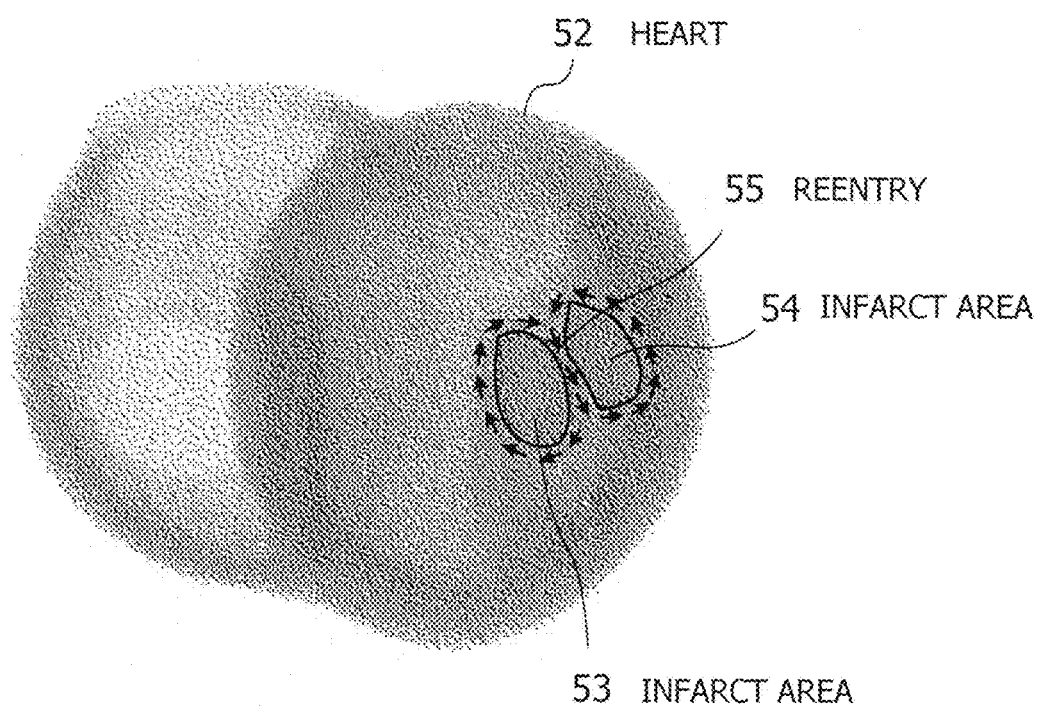
FIG. 11 illustrates a part of a heart having a reentrant area.

Reentry is one of the causes of cardiac arrhythmia. FIG. 11 illustrates, in a simplified way, a heart having a reentrant area. This heart 52 has two infarct areas 53 and 54, which have lost the ability of excitation. However, the narrow myocardial region between those infarct areas 53 and 54 is still excitable and thus acts as reentry 55. When a wave of excitation arrives, this reentry 55 permits it to propagate from one end to the opposite end, where the wave spreads again toward other regions in the heart. Accordingly the excitation circles around the infarct areas 53 and 54 repeatedly, thus causing fibrillation of myocardium.

Medical practitioners treat this type of fibrillation by cauterizing both the entrance and exit of the reentry 55 with a procedure called catheter ablation. Catheter ablation nullifies the undesired electrical pathway, thereby suppressing the fibrillation of myocardium.

To ensure the effectiveness of catheter ablation, it is important to determine the exact location of the reentry. This may be done with a couple of pictures displayed on a monitor screen, such as those discussed in FIG. 10, in which an image of the heart in question is drawn in multiple colors mapped to a full range (i.e., from global minimum to global maximum) of voltages produced therein. For example, the maximum voltage level is observed in the sinoatrial node 45, which is the source of electrical signals. On the other hand, the voltage level of reentrant areas is lower than that of the sinoatrial node 45. If the color range was mapped to a full range of voltages observed in the entire heart, voltage variations in and around reentrant areas would only be seen as subtle differences in color. It would therefore be difficult to visually locate those reentrant areas lurking in the picture.

In view of the above, the second embodiment maps display color values onto local voltage levels in and around a reentrant area, so that the viewer can see the propagation of excitation in that area more clearly. To this end, the visualization unit 150 of the second embodiment is configured to find reentry on the basis of information about infarct areas in the heart in question and determine a measurement point on the reentry path. This measurement point may be placed in, for example, the narrowest part between two adjacent infarct areas. The next part of the description provides details of an algorithm for determining the presence of reentry from infarct areas and indicating it in a more conspicuous manner.

Figure 12:
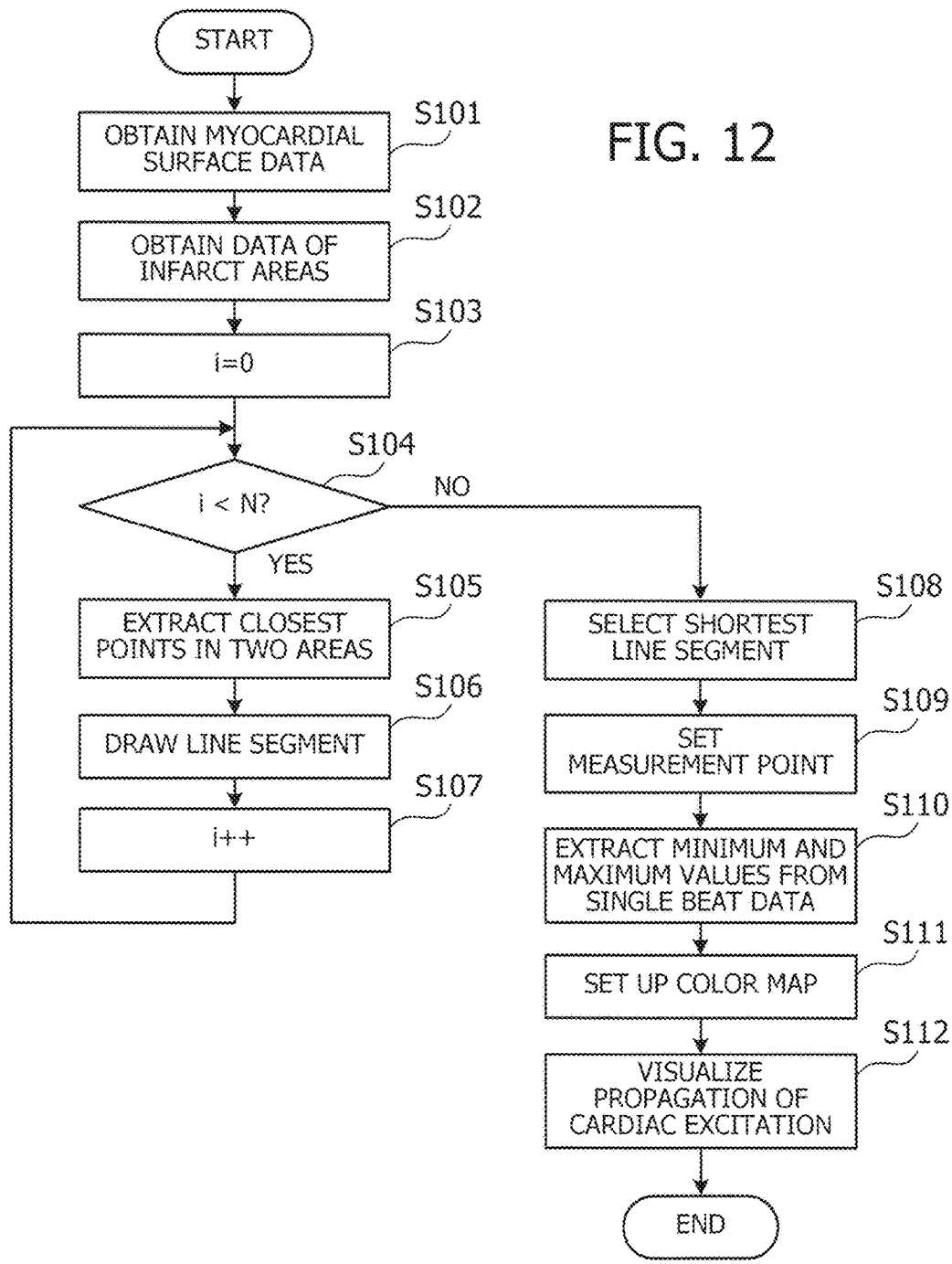
FIG. 12 is a flowchart illustrating an example of a reentry indication procedure.

FIG. 12 is a flowchart illustrating an example of a reentry indication procedure. This procedure is executed by the computer 100 in response to a user command that requests to find and display a reentrant area in the heart under simulation. The user command includes several user-specified parameters that designate, for example, a cross-sectional position, sectional view method, display format, wireframe mode, and physical quantity.

More specifically, the cross-sectional position parameter designates the position of a cross-sectional plane of a heart. The sectional view method parameter designates, for example, in what angle the cross section is to be viewed. The display format parameter permits the user to select what method to use for drawing (e.g., shading) nodes and elements. The wireframe mode parameter designates whether to display the heart in the form of a wireframe model. In wireframe mode, the heart is rendered as a set of simple contour edges. The physical quantity parameter designates a specific physical quantity that the user desires to view. Voltage is designated in the present case because the purpose is reentry indication.

Each operation seen in the flowchart of FIG. 12 will now be described below in the order of step numbers.

(Step S101) The visualization unit 150 obtains myocardial surface data from a given three-dimensional cardiac model. For example, the unstructured grid data storage unit 110 contains data of nodes in the node data table 111 and data of elements in the element data table 112. Based on those pieces of data, the visualization unit 150 recognizes the structure of the three-dimensional cardiac model, thus obtaining its surface data.

(Step S102) The visualization unit 150 then obtains data of infarct areas from the infarct area table 141 stored in the infarct area storage unit 140. During this course, the visualization unit 150 produces as many combinations of two infarct areas as possible and assigns successively larger numbers to those combinations, from zero to N−1, where N is the total number of such combinations.

(Step S103) The visualization unit 150 initializes a counter variable i to zero.

(Step S104) The visualization unit 150 determines whether variable i is smaller than the number N of infarct area combinations. If i<N, the process advances to step S105. If i=N, the process branches to step S108.

(Step S105) Consider now that two points are set in the i-th combination of infarct areas, one for each area. While there are many possible pairs of such points, the visualization unit 150 extracts the closest pair of points by using an efficient technique for this purpose (e.g., the divide and conquer algorithm for solving a closest pair problem).

(Step S106) The visualization unit 150 places a line segment connecting the closest pair of points selected at step S105.

(Step S107) The visualization unit 150 increments variable i by one and goes back to step S104.

(Step S108) The above steps S104 to S107 have given a line segment to every possible combination of infarct areas. The visualization unit 150 now selects the shortest one of the line segments.

(Step S109) The visualization unit 150 sets a measurement point on the line segment selected at step S108 by choosing an appropriate place other than in the infarct areas.

(Step S110) The visualization unit 150 searches the stored simulation result data of a single heart beat cycle to extract minimum and maximum voltage values at the measurement point.

(Step S111) The visualization unit 150 sets up a color map that associates different color values with different voltage values within a range between the minimum and maximum values of voltage at the measurement point.

(Step S112) Based on the simulation result data, the visualization unit 150 produces a picture of the three-dimensional cardiac model on the monitor screen so as to visualize the distribution of myocardial voltages in multiple colors. The visualization unit 150 updates this picture according to the progress of simulation steps, so that the viewer will clearly understand how the myocardial excitation propagates in and around the reentrant area.

A specific example of the above-described procedure of FIG. 12 will now be described below. First, the visualization unit 150 locates infarct areas by interacting with the user or automatically by itself. For example, the user specifies which physical quantity in the myocardium datasets to use, as well as designating a cross-sectional plane, and commands the visualization unit 150 to visualize a voltage distribution on the myocardial surface at a particular time step by using multiple colors. The color map used in this stage provides an initial mapping of display colors. For example, this initial mapping assigns different colors to a full range of voltages observed in the entire body of myocardium.

Figure 13:
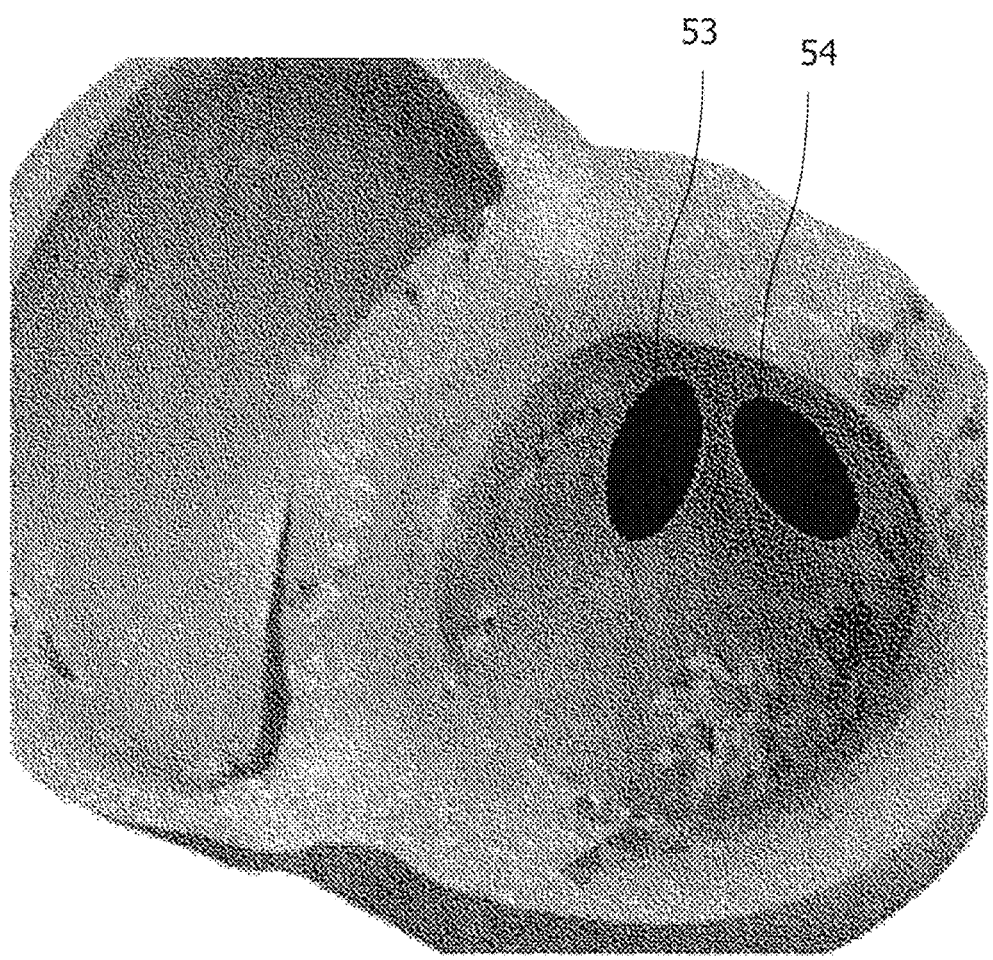
FIG. 13 is a sectional view of a heart in which infarct areas are seen.

FIG. 13 is a sectional view of a heart in which infarct areas are seen. The computer 100 produces a sectional image depicting the inside of a heart, including infarct areas 53 and 54, as seen in FIG. 13. Infarct areas generally exhibit lower voltage levels than any other areas in the heart. The user thus specifies such areas having a color associated with the lowest voltage and instructs the computer 100 to mark them as infarct areas 53 and 54. In response, the visualization unit 150 registers the infarct areas 53 and 54 specified by the user by adding their respective area definitions in the infarct area storage unit 140. As an alternative, the visualization unit 150 may be configured to find infarct areas automatically by extracting lowest-voltage portions from a given distribution (e.g., histogram) of voltage levels.

Figure 14:
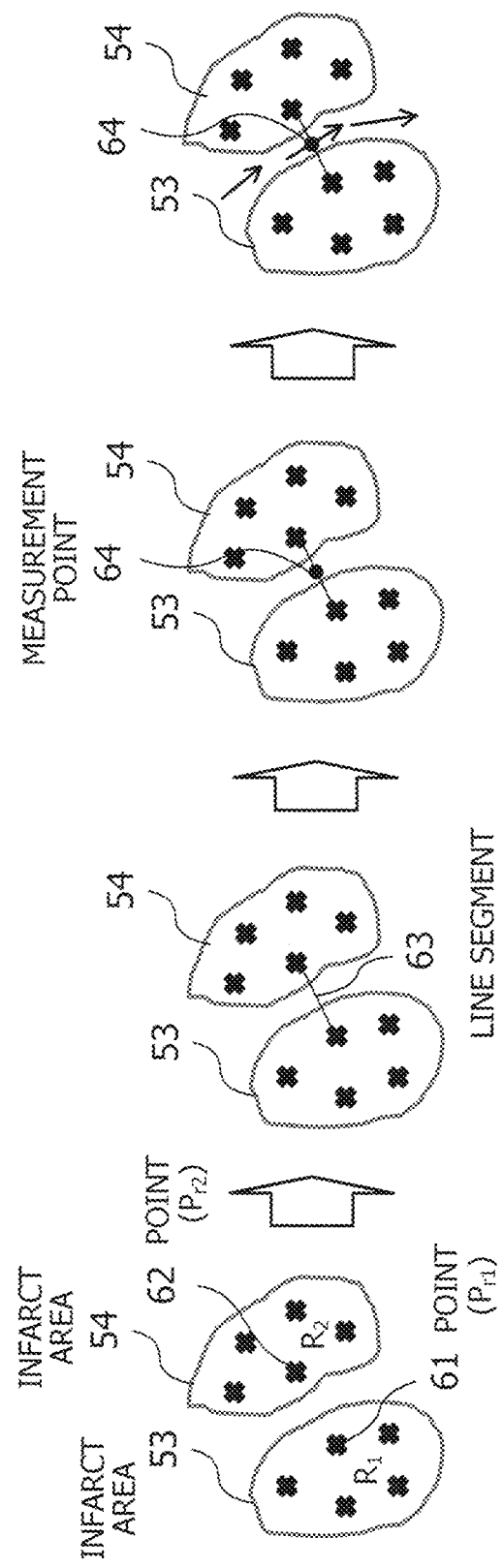
FIG. 14 illustrates an example of how a measurement point is set.

Now that infarct areas have been determined, the visualization unit 150 then places an appropriate measurement point in each reentrant area located between two infarct areas. FIG. 14 illustrates an example of how a measurement point is set. Suppose here that there are a plurality (n) of infarct areas, where n is an integer greater than one. These infarct areas are thus labeled $R_1, R_2, \ldots, R_n$. For simplicity, FIG. 14 illustrates only two such areas $R_1$ (infarct area 53) and $R_2$ (infarct area 54). The visualization unit 150 places several points 61, 62, . . . in these areas $R_1$ and $R_2$ by selecting random coordinates inside them, for example.

The visualization unit 150 now calculates the distance between each two points, selecting one point in area $R_1$ and the other point in area $R_2$. The visualization unit 150 then finds a pair of points whose distance is the smallest of all and extracts these points as "representative points." In the example of FIG. 14, points 61 and 62 are extracted as the representative points, where the symbols $P_{r1}$ and $P_{r2}$ represent the coordinates of the two points 61 and 62, respectively.

The visualization unit 150 draws a line segment 63 between the extracted representative points. This line segment 63 runs through an intermediate space of the two areas $R_1$ and $R_2$ and terminates at the representative points 61 and 62. The visualization unit 150 then defines a measurement point 64 at a point on the line segment 63 that does not belong to the infarct areas. The visualization unit 150 may place more such measurement points 64, although FIG. 14 illustrates only one point.

The above operations have produced a measurement point 64 on the shortest line segment that connects two infarct areas 53 and 54. That is, the position of the measurement point 64 has been determined on the basis of the lengths of line segments connecting a plurality of points in each of the infarct areas 53 and 54. This algorithm enables the visualization unit 150 to find a narrow space between the infarct areas 53 and 54, thus making it easier to select an appropriate position for the measurement point.

Figure 15:
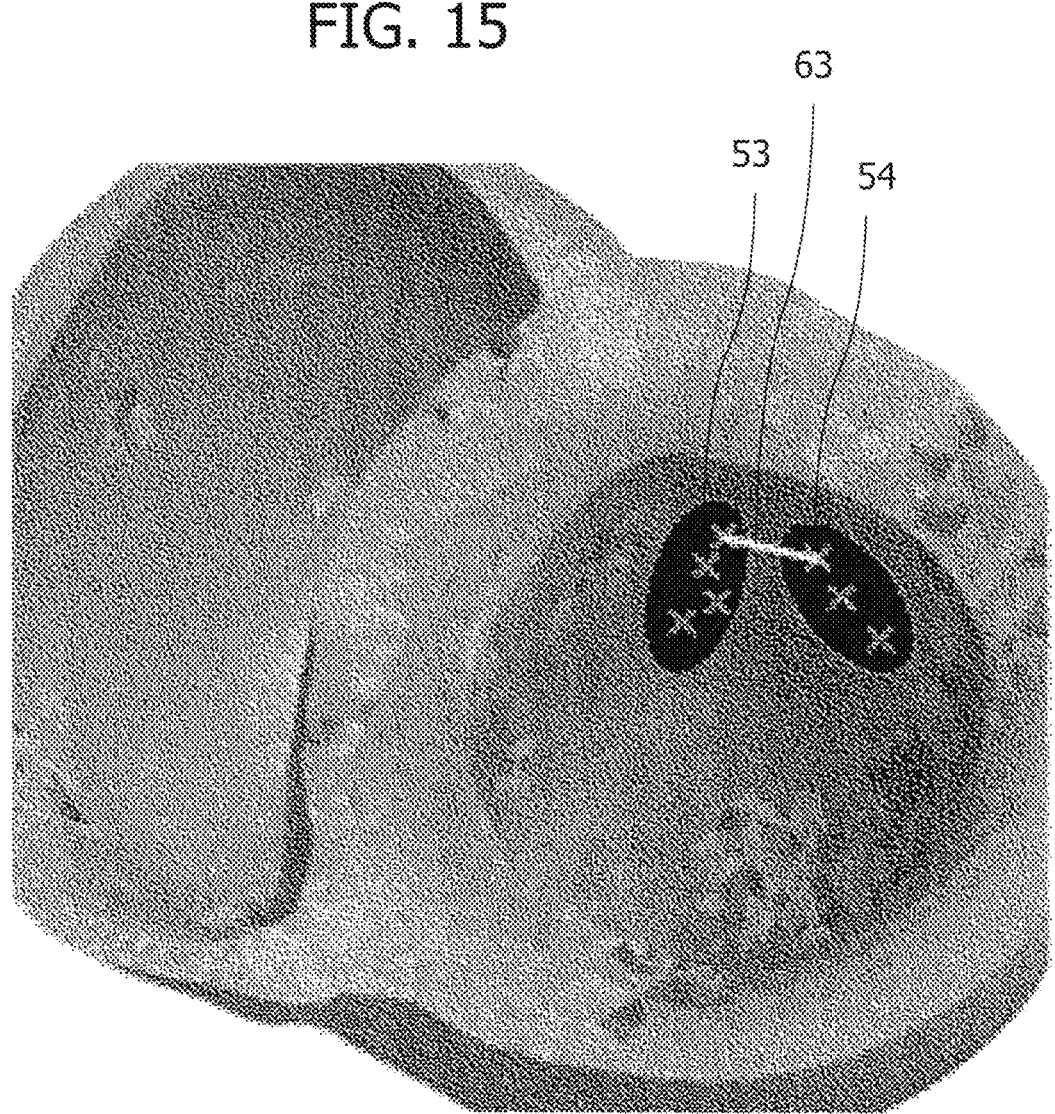
FIG. 15 is a sectional view of a heart in which a line segment is drawn between infarct areas.
Figure 16:
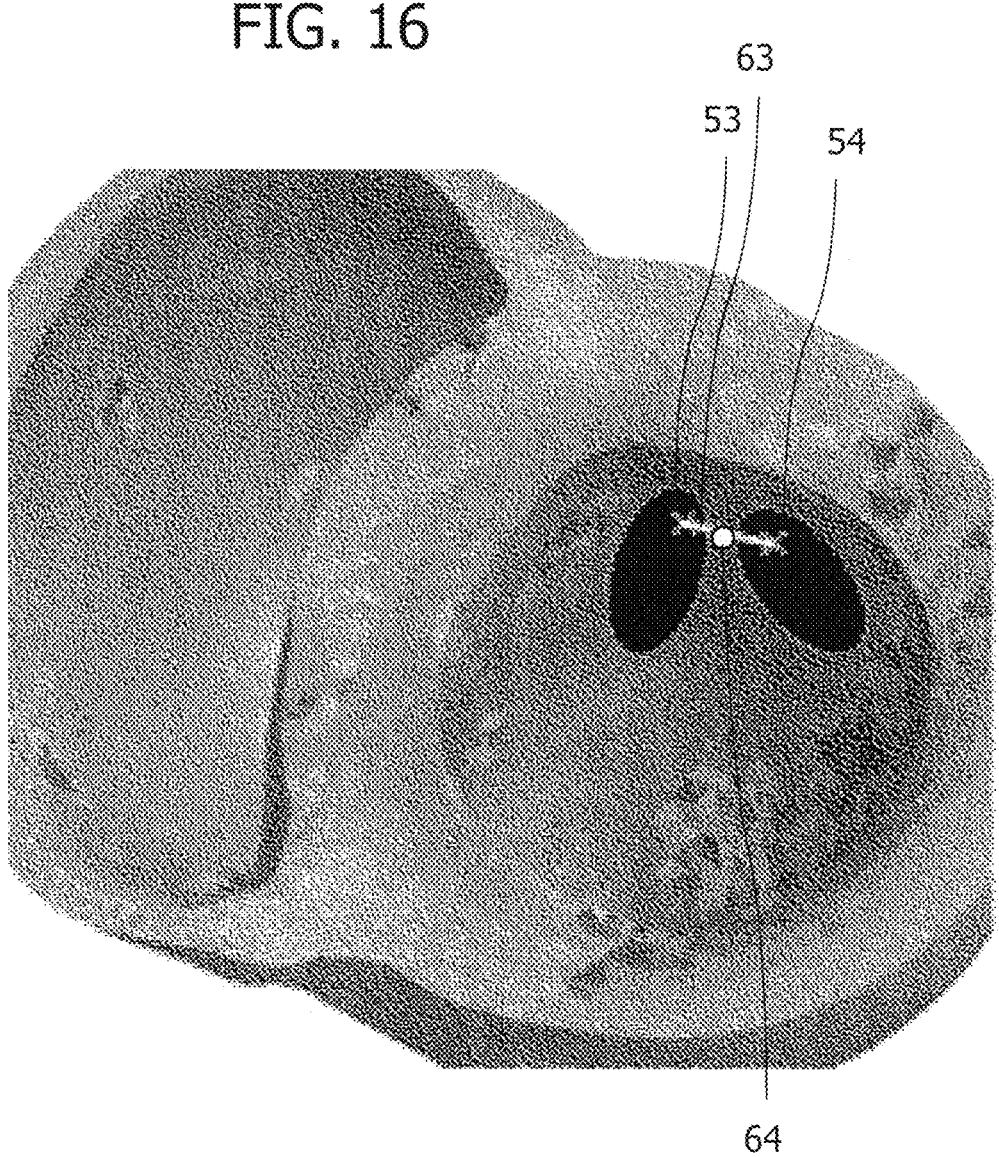
FIG. 16 is another sectional view of the heart in which a measurement point is placed on the line segment between infarct areas.

The above-described line segment connecting infarct areas 53 and 54 and its corresponding measurement point may be plotted in a sectional view of the heart as seen in FIGS. 15 and 16. Specifically, FIG. 15 is a sectional view of a heart in which a line segment is drawn between infarct areas. A few points are set in each infarct area 53 and 54, and their distances are calculated. A line segment 63 is drawn between the nearest two points.

FIG. 16 is another sectional view of the heart in which a measurement point is placed on the line segment between infarct areas. A reentrant area lies between the two infarct areas 53 and 54, and a measurement point 64 is located right in the narrowest part of this reentrant area. This selection of a measurement point location is advantageous for the following reasons. Electric signals of cardiac excitation propagate through such a reentrant area, and their waves concentrate into the narrowest part of the same, thus raising the electrical potential in that part. Therefore the voltage level observed at the measurement point 64 is likely to exhibit a local maximum in the reentrant area. It is also noted that the voltage level in the reentrant area, including the measurement point 64, stays at about zero until an electric signal arrives there. This means that the voltage level at the measurement point 64 exhibits a local minimum in the reentrant area during the period of one heart beat cycle.

As mentioned earlier, the three-dimensional cardiac model in the present embodiment is built with an unstructured grid. The motion of heart beat therefore affects the spatial position of the measurement point 64. To calculate the exact voltage variations at this moving measurement point 64, the visualization unit 150 tracks its position during one beat cycle, thereby obtaining a locus of the measurement point 64. Then, with the obtained locus data of one heart beat cycle, the visualization unit 150 tracks temporal variations at the nodes that constitute a computational mesh (tetrahedral element or voxel element) containing the measurement point 64.

Figure 17:
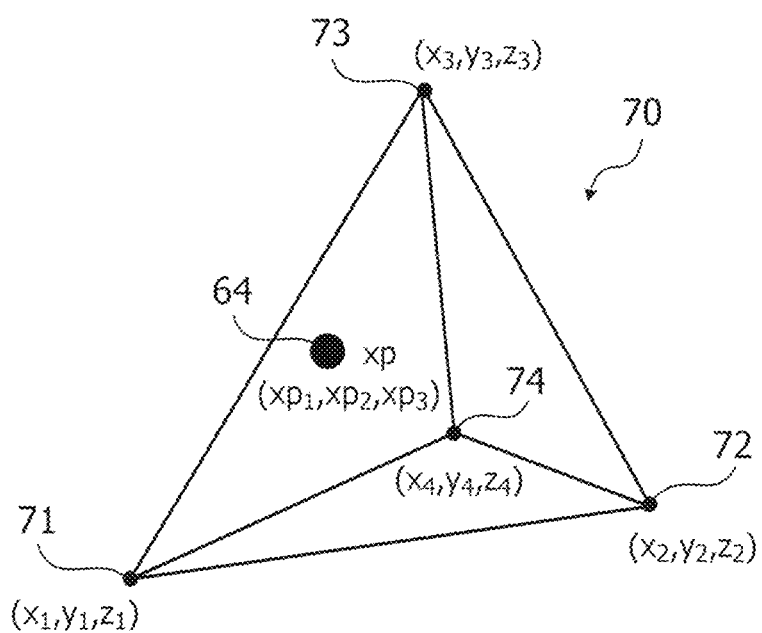
FIG. 17 illustrates an example of an element of the three-dimensional model which contains a measurement point.

FIG. 17 illustrates an example of an element of the three-dimensional model which contains a measurement point. The illustrated tetrahedral element 70 has four nodes 71 to 74, whose respective coordinates are $(x_1, y_1, z_1)$, $(x_2, y_2, z_2)$, $(x_3, y_3, z_3)$, and $(x_4, y_4, z_4)$. The measurement point 64 is located at $(xp_1, xp_2, xp_3)$ inside the element 70. Specifically, the position of the measurement point 64 is expressed by the following equation (1).

$$\begin{pmatrix} xp_1 \\ xp_2 \\ xp_3 \\ 1 \end{pmatrix} = \begin{pmatrix} x_1 & x_2 & x_3 & x_4 \\ y_1 & y_2 & y_3 & y_4 \\ z_1 & z_2 & z_3 & z_4 \\ 1 & 1 & 1 & 1 \end{pmatrix} \begin{pmatrix} \xi \\ \eta \\ \zeta \\ \delta \end{pmatrix} \quad (1)$$

where the vector on the right side is formed from four parameters $\xi$, $\eta$, $\zeta$, and $\delta$ for determining the measurement point position.

The visualization unit 150 enters the initial coordinates of the measurement point 64 and its surrounding nodes to equation (1), which represent their stationary positions before a heart beat occurs. The visualization unit 150 calculates parameters $\xi$, $\eta$, $\zeta$, and $\delta$ back from this initial state of equation (1).

Then for each simulation time step, the visualization unit 150 calculates coordinates $(xp_1, xp_2, xp_3)$ of the measurement point 64 by entering new coordinates of the nodes 71 to 74 to equation (1) with the above-calculated parameters $\xi$, $\eta$, $\zeta$, and $\delta$.

Simulation of cardiac excitation propagation may sometimes be performed without mimicking myocardial motions of heart beats. When that is the case, the three-dimensional model elements may be represented by fixed voxels. Simulation assuming no myocardial motions means that the measurement point 64 is also fixed during the simulation, and the visualization unit 150 does not need to keep track of its spatial position. That is, the visualization unit 150 has only to determine the minimum value and maximum value of voltage at the given measurement point 64, assuming that its position is fixed.

Figure 18:
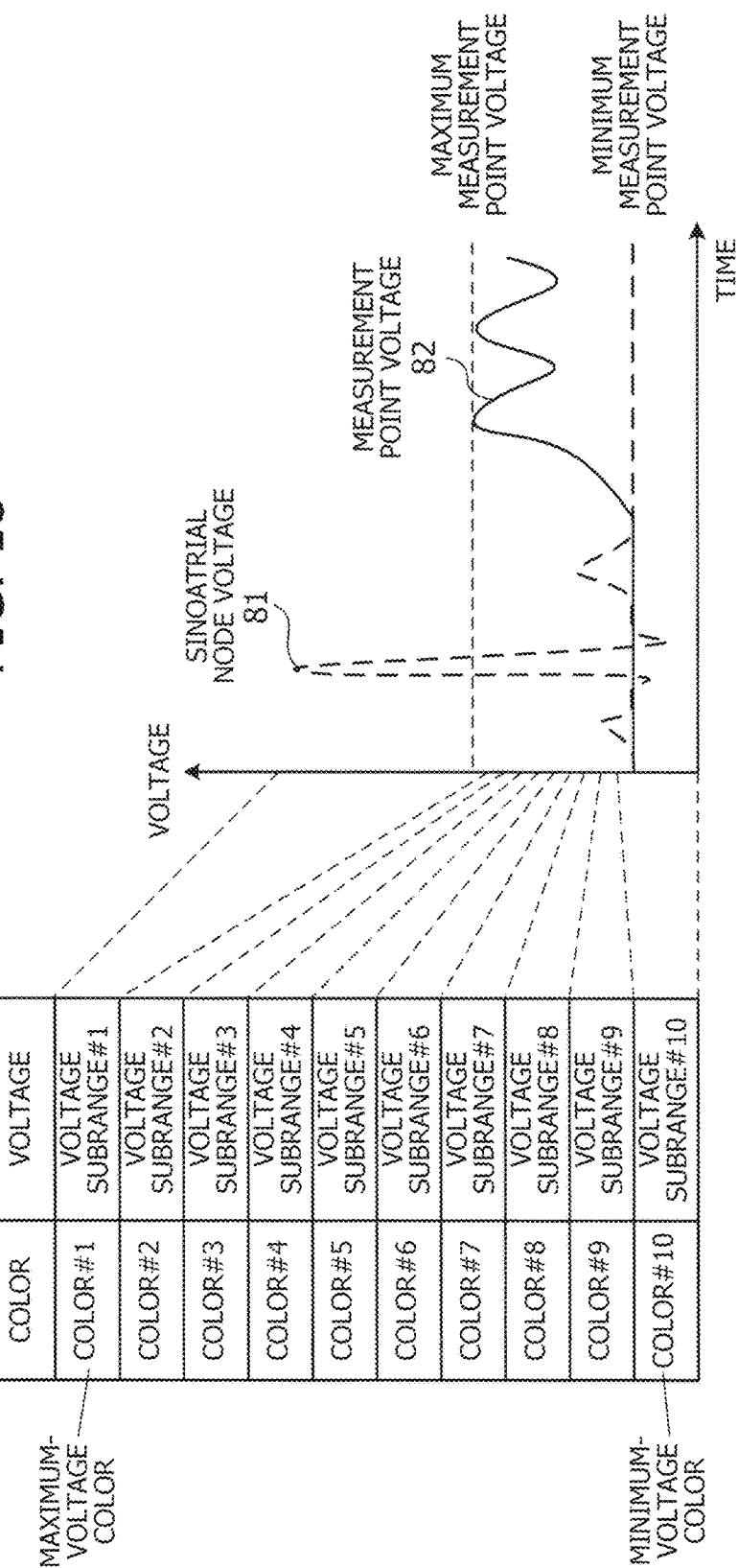
FIG. 18 illustrates an exemplary setup of a color map.

The visualization unit 150 now sets up the color map with the obtained maximum and minimum voltage values, assigning them to particular colors that are supposed to indicate maximum and minimum voltage levels. These colors are referred to as "maximum-voltage color" and "minimum-voltage color." FIG. 18 illustrates an exemplary setup of a color map. The illustrated color map 80 is made up of different color values and their associated voltage subranges. Those colors are used to visualize a voltage distribution in the heart. As seen in the right half of FIG. 18, the maximum value of measurement point voltage 82 is substantially lower than the peak value of sinoatrial node voltage 81. The visualization unit 150 sets up the color map 80, taking the maximum measurement point voltage into special consideration as follows.

Referring to the example of FIG. 18, the color map 80 accommodates ten color values to be mapped to voltage subranges. For example, the color map 80 may be configured to provide ten steps of chromatic gradation from red to blue, corresponding to the lowest voltage to the highest voltage. Alternatively, the color map 80 may be configured to provide ten steps of luminance gradation of a specific color, so that brighter tones represent higher voltages and darker tones represent lower voltages. The color map 80 illustrated in FIG. 18 assigns its upper positions to color values closer to the maximum-voltage color.

In the context described above, the visualization unit 150 divides the minimum-to-maximum range of measurement point voltage into ten subranges and assigns those voltage subranges to color values in such a way that higher voltage ranges go to upper part of the color map 80. The color map 80 further supports voltages above the maximum measurement point voltage, as well as voltages below the minimum measurement point voltage. For example, the former voltages are mapped uniformly to the maximum-voltage color, and the latter voltages are mapped uniformly to the minimum-voltage color. The established color map 80 is then sent to, for example, the memory 102 for storage.

As seen from the above example, all color values available in the color map 80 are assigned to the minimum-to-maximum range of measurement point voltage, so that the user can see the voltage variations in that range more clearly. The use of this color map 80 enables the visualization unit 150 to visualize the propagation of cardiac excitation with an emphasis on the reentry.

Figure 19:
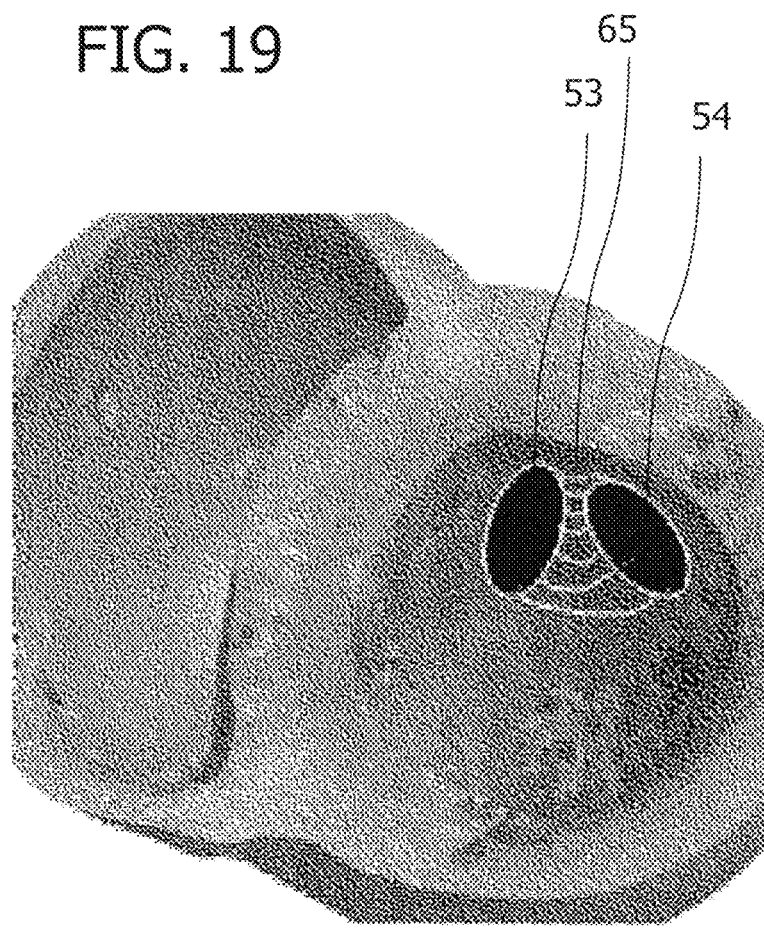
FIG. 19 is an example of a screenshot depicting propagation of cardiac excitation with emphasis on reentry.

FIG. 19 is an example of a screenshot depicting propagation of cardiac excitation with emphasis on reentry. Since the maximum-voltage color in the color map 80 is associated with the maximum level of measurement point voltage, FIG. 19 clearly depicts traveling waves 65 of cardiac excitation that move forward in a reentrant area between two infarct areas 53 and 54, where the most prominent maximum-voltage color indicates their wavefront lines in a distinguishable manner. Such simulation pictures presented on the monitor screen facilitate the user (e.g., doctor) to locate the reentry that needs to be cauterized, thus making it possible to perform a catheter ablation procedure more efficiently and properly.

The above-described second embodiment produces a picture depicting propagation of cardiac excitation on the basis of simulation result data. The second embodiment is, however, not limited by this data source. Alternatively, similar pictures may be produced on the basis of measurement results of electrical activities in a patient's heart.

The above sections have exemplified several embodiments and their variations. The described components may be replaced with other components having equivalent functions or may include some additional components or processing operations. Where appropriate, two or more components and features of the above-described embodiments may be combined in different ways. In one aspect of the embodiments described above, the proposed techniques enhance the visibility of cardiac excitation propagating through an accessory pathway.

All examples and conditional language provided herein are intended for the pedagogical purposes of aiding the reader in understanding the invention and the concepts is contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A visualization apparatus comprising:
    a memory configured to store a three-dimensional model of a heart, excitation propagation data, and infarct area data, the excitation propagation data indicating temporal variations of electrical signal strength in myocardium during propagation of excitation in the heart, the infarct area data indicating locations of infarct areas in the heart; and
    a processor configured to perform a procedure including:
        placing a plurality of points in each of a first infarct area and a second infarct area adjacent thereto,
        producing a plurality of line segments between the points placed in the first infarct area and the points placed in the second infarct area,
        placing a measurement point on one of the line segments that is the shortest of all, the measurement point being neither in the first infarct area nor in the second infarct area,
        determining a variation range of electrical signal strength, based on the excitation propagation data, the variation range being a range between minimum and maximum values of electrical signal strength at the measurement point, and
        outputting a picture that visualizes propagation of cardiac excitation in the three-dimensional model, based on the excitation propagation data, by varying a visual property in the picture to represent variations of the electric signal strength in myocardium within the determined variation range.

2. The visualization apparatus according to claim 1, wherein the determining a variation range includes:
    obtaining a locus of the measurement point that moves as a result of deformation of the three-dimensional model during a simulated beating motion of the heart; and
    determining the minimum and maximum values of electrical signal strength on the obtained locus of the measurement point.

3. The visualization apparatus according to claim 1, wherein the visual property is hue, saturation, value, or any combination thereof.

4. A visualization method comprising:
    placing, by a processor, a plurality of points in each of a first infarct area and a second infarct area adjacent thereto,
    producing, by the processor, a plurality of line segments between the points placed in the first infarct area and the points placed in the second infarct area,
    placing, by the processor, a measurement point on one of the line segments that is the shortest of all, the measurement point being neither in the first infarct area nor in the second infarct area;
    determining, by the processor, a variation range of electrical signal strength, based on excitation propagation data indicating temporal variations of electrical signal strength in myocardium during propagation of excitation in the heart, the variation range being a range between minimum and maximum values of electrical signal strength at the measurement point, and
    outputting, by the processor, a picture that visualizes propagation of cardiac excitation in the three-dimensional model, based on the excitation propagation data, by varying a visual property in the picture to represent variations of the electric signal strength in myocardium within the determined variation range.

5. A non-transitory computer-readable storage medium storing a visualization program, wherein the visualization program causes a computer to perform a procedure comprising:
    placing a plurality of points in each of a first infarct area and a second infarct area adjacent thereto,
    producing a plurality of line segments between the points placed in the first infarct area and the points placed in the second infarct area,
    placing a measurement point on one of the line segments that is the shortest of all, the measurement point being neither in the first infarct area nor in the second infarct area;
    determining a variation range of electrical signal strength, based on excitation propagation data indicating temporal variations of electrical signal strength in myocardium during propagation of excitation in the heart, the variation range being a range between minimum and maximum values of electrical signal strength at the measurement point, and outputting a picture that visualizes propagation of cardiac excitation in the three-dimensional model, based on the excitation propagation data, by varying a visual property in the picture to represent variations of the electric signal strength in myocardium within the determined variation range.

\* \* \* \* \*